US012711691B1

(12) United States Patent
Cameron

(10) Patent No.: US 12,711,691 B1
(45) Date of Patent: Aug. 18, 2026

(54) INTEGRATED CIRCUIT, COMPUTER SYSTEM, AND RELATED METHODS FOR THREE-DIMENSIONAL (3D) GRAPHICS AND MODULAR OPERATIONS

(71) Applicant: Brian Cameron, Chicago, IL (US)

(72) Inventor: Brian Cameron, Chicago, IL (US)

( * ) Notice: Subject to any disclaimer, the term of this patent is extended or adjusted under 35 U.S.C. 154(b) by 0 days.

(21) Appl. No.: 19/532,634

(22) Filed: Feb. 6, 2026

(51) Int. Cl.
*G06T 15/00* (2011.01)
*G06F 17/11* (2006.01)
*G06T 15/04* (2011.01)
*G06T 17/20* (2006.01)

(52) U.S. Cl.
CPC ............ *G06T 15/005* (2013.01); *G06F 17/11* (2013.01); *G06T 15/04* (2013.01); *G06T 17/20* (2013.01); *G06T 2210/52* (2013.01)

(58) Field of Classification Search
CPC ....... G06T 15/005; G06T 15/04; G06T 17/20; G06T 2210/52; G06F 17/11
See application file for complete search history.

(56) References Cited

U.S. PATENT DOCUMENTS 6,898,613 B1 * 5/2005 Robinson ................ G06F 7/729 708/491
7,043,515 B2 * 5/2006 Stojancic ............. G11C 7/1006 708/491
7,216,306 B1 * 5/2007 Li ....................... G06F 30/3323 716/107
9,841,945 B2 * 12/2017 Sharma ..................... G06F 5/01
10,511,531 B1 * 12/2019 Matthews ............... G06F 17/10
2007/0297601 A1 * 12/2007 Hasenplaugh ............ G06F 7/72 380/28

(Continued)

FOREIGN PATENT DOCUMENTS

WO WO-2024119200 A2 * 6/2024 ............. G06F 7/724

OTHER PUBLICATIONS

Glesner, S., & Blech, J. O. (2004). Classifying and formally verifying integer constant folding. Electronic Notes in Theoretical Computer Science, 82(2), 410-425.*

(Continued)

*Primary Examiner* — Sarah Lhymn
(74) *Attorney, Agent, or Firm* — MARSHALL, GERSTEIN & BORUN LLP

(57) ABSTRACT

An integrated circuit configured to control execution of operations for computing modular coordinates for an integer relative to a modulus. The operations comprise fetching folding constants and a reciprocal constant from the cache, loading these values with the integer and modulus into a set of first registers, decomposing the integer into binary chunks using hardwired operations, computing an intermediate folded value as the sum of products between each folding constant and corresponding binary chunk, normalizing the intermediate folded value, computing a spin estimate as high bits of the product of the integer and reciprocal constant, obtaining a corrected spin from the spin estimate, and outputting the normalized residue and corrected spin as a coordinate pair. A computer system for computing modular coordinates for a set of integers representing vertices of a triangle in a three-dimensional graphical space, relative to a modulus, performing similar operations.

20 Claims, 10 Drawing Sheets

(56) References Cited

U.S. PATENT DOCUMENTS

| | | | | |
|---|---|---|---|---|
| 2009/0180609 | A1 * | 7/2009 | Douguet | G06F 7/72 380/28 |
| 2021/0213973 | A1 * | 7/2021 | Carillo Peña | G06N 3/063 |
| 2023/0401037 | A1 * | 12/2023 | Ozturk | G06F 7/728 |

OTHER PUBLICATIONS

Borodin, A., & Petrov, L. (2018). Higher spin six vertex model and symmetric rational functions. Selecta Mathematica, 24(2), 751-874.*

Stern, M., Pinson, M. B., & Murugan, A. (2017). The complexity of folding self-folding origami. Physical Review X, 7(4), 041070.*

Garoufalidis, S., & Van Der Veen, R. (2013). Asymptotics of classical spin networks. Geometry & Topology, 17(1), 1-37.*

Giordano, S. (2017). Spin variable approach for the statistical mechanics of folding and unfolding chains. Soft Matter, 13(38), 6877-6893.*

Barrett, Paul, "Implementing the Rivest Shamir and Adleman Public Key Encryption Algorithm on a Standard Digital Signal Processor", Computer Security Ltd, 1986.

Montgomery, Peter L., "Modular Multiplication Without Trial Division", Mathematics of Computation, vol. 44, No. 170, pp. 519-521, 1985.

Cameron, Brian, "Persistent Modular Coordinates: Relocating Decomposition Cost in Streaming Systems", submitted to "Software: Practice and Experience" on Mar. 9, 2026 (under consideration).

Lemire, Daniel, "Faster reminders when the divisor is a constant: beating compilers and libdivide", retrieved from the Internet at https://lemire.me/blog/2019/02/08/faster-remainders-when-the-divisor-is-a-constant-beating-compilers-and-libdivide/ on Apr. 20, 2026.

"Persistent Modular Coordinates Benchmarks", retrieved from the Internet at https://github.com/yippibrian/persistent-modular-coordinates on Apr. 20, 2026.

"Persistent Modular Coordinates/make-test-out.txt" retrieved from the Internet at https://github.com/yippibrian/persistent-modular-coordinates on Apr. 20, 2026.

* cited by examiner

702-A $$k_i = 2^{B_i} \bmod W$$

where $k_i$ are the one or more folding constants, $B_i$ are the starting bit positions for the binary chunk $i$, and $W$ is the modulus.

FIG. 7A

702-B $$r_{raw} = \sum_{i=0}^{n-1} a_i k_i$$

where $r_{raw}$ is the intermediate folded value prior to normalization, $n$ corresponds to the number of binary chunks derived from the bit-width of the integer and the chosen chunk size, and $a_i$ are the one or more binary chunks extracted from the integer.

FIG. 7B

702-C $$\mu = [\frac{2^b}{W}]$$

Where $\mu$ is the reciprocal constant, $b$ is a selected bit-width, and $W$ is the modulus.

FIG. 7C

702-D $$s_{est} = \mathrm{HIGH}(N * \mu)$$

where $s_{est}$ is the spin estimate, $N$ is the integer, $\mu$ is the reciprocal constant, and HIGH is a high-bit extraction operator that returns the upper bits of a double-width product.

FIG. 7D

INTEGRATED CIRCUIT, COMPUTER SYSTEM, AND RELATED METHODS FOR THREE-DIMENSIONAL (3D) GRAPHICS AND MODULAR OPERATIONS

FIELD OF THE INVENTION

The present disclosure relates to an integrated circuit and a computing system for processing three-dimensional (3D) graphics that compute modular coordinates for integers relative to a modulus using divider-less folding techniques, and that perform modular arithmetic operations, for example, for implementing the same.

BACKGROUND

Modern computing systems perform arithmetic operations across a wide range of applications, including cryptographic protocols, hash table indexing, number-theoretic algorithms, primality testing, sieving operations, data processing pipelines, and graphics rendering. Among these arithmetic operations, modular arithmetic (the operation of calculating the remainder of an integer divided by a modulus) represents a foundational operation that appears throughout computational workloads. Integrated circuits, including processors and specialized arithmetic units, execute modular arithmetic by determining both a residue (the remainder) and, in some cases, a quotient representing how many complete cycles of the modulus fit within a given integer value.

Division operations present substantial performance challenges for integrated circuits. At the hardware level, performing division operations requires iterative algorithms which consume multiple clock cycles to produce a result. Unlike multiplication and addition, which can be implemented using combinational logic with predictable latency, division circuits involve sequential feedback loops that extend execution time. The area and power consumption of dedicated division units on an integrated circuit are disproportionately large relative to other arithmetic functional units. As a result, many processor architectures either omit hardware dividers entirely or implement them with significantly lower throughput than multipliers. When software must perform modular reduction on an integrated circuit lacking efficient division hardware, the computational cost increases further due to emulation overhead, which is the extra computational cost of using software to implement modular reduction through conventional reciprocal multiplication and correction steps when hardware division is unavailable or inefficient.

Computer systems that rely on modular arithmetic for high-throughput workloads experience performance degradation attributable to division latency. In systems executing high-throughput algorithms, each modular reduction operation may invoke a division instruction or its software equivalent, creating bottlenecks. For example, systems running cryptographic algorithms experience delays in encryption, decryption, and digital signature computations. Hash table implementations that map keys to bucket indices using modular reduction similarly incur division overhead on each lookup or insertion. Streaming data pipelines that process sequential integer values and require modular indexing face cumulative latency delays when division is invoked repeatedly. Because division operations are far slower than addition or multiplication, systems that rely on frequent modular computations face performance constraints.

Further, computer graphics applications illustrate the performance impact of division-based modular arithmetic. Graphics processing pipelines frequently employ modular operations for screen wrapping, texture tiling, pattern animation, pixel dithering, and processing polygonal meshes. When rendering three-dimensional scenes composed of polygonal meshes, vertex coordinates and texture indices may undergo modular reduction (i.e., computing the remainder) to implement repeating patterns or bounded coordinate spaces. Each division operation within the rendering pipeline contributes to frame latency, reducing the achievable frame rate or requiring additional hardware resources to maintain real-time performance. The cumulative effect of division overhead across thousands or millions of vertices and texture samples per frame creates measurable constraints on graphics system throughput. This results in reduced frame rates, visual stuttering, or the need for additional hardware resources to maintain real-time performance.

Conventional techniques for accelerating modular arithmetic attempt to replace division with multiplication-based approximations. Some conventional techniques precompute a reciprocal approximation of the modulus and use multiplication followed by correction steps to estimate the quotient and residue. Other techniques transform operands into a special representation domain, perform modular multiplication within that domain, and require conversion steps when entering or exiting the domain. Software libraries may employ reciprocal multiply-shift sequences to emulate division by constants. While these techniques reduce the latency of individual modular operations compared to direct division, they retain several limitations. These methods still require correction steps to handle estimation errors introduced by finite-precision reciprocal approximations and truncation effects. The modulus is treated as an arbitrary value without alignment to the binary structure of the operand representation. Incremental updates to sequential integer values require re-computation of the full reduction rather than local adjustments. No systematic correspondence exists between the binary chunk boundaries of an integer and its modular representation under these conventional approaches.

Therefore, a need exists for methods and systems that compute modular coordinates without invoking division in the primary execution path, while aligning the modulus with binary chunk boundaries and supporting incremental streaming updates, to address the performance constraints associated with division-based and conventional reciprocal-based modular arithmetic techniques.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

The foregoing general description of the illustrative embodiments and the following detailed description thereof are merely exemplary aspects of the teachings of this disclosure and are not restrictive.

In one embodiment, an integrated circuit, comprising: (a) a cache; (b) one or more registers; (c) one or more digital circuits; and (d) a control unit (CU) configured to control execution of operations for computing modular coordinates for an integer relative to a modulus, the operations comprising: (i) fetching, from the cache, one or more folding constants, wherein the one or more folding constants are precomputed using the modulus; (ii) fetching, from the cache, a reciprocal constant, wherein the reciprocal constant is precomputed using the modulus; (iii) loading the integer, the modulus, the one or more folding constants and the reciprocal constant into a set of first registers; (iv) decomposing, using one or more hardwired operations, the integer into binary chunks; (v) computing, using the one or more digital circuits, an intermediate folded value, wherein the intermediate folded value is a sum of products of each folding constant and its corresponding binary chunk; (vi) normalizing, using the one or more digital circuits, the intermediate folded value by using a bounded number of subtraction operations to obtain a normalized residue; (vii) computing, using the one or more digital circuits, a spin estimate, wherein the spin estimate comprises one or more high bits of a product of the integer and the reciprocal constant; (viii) obtaining, using the one or more digital circuits, a corrected spin from the spin estimate; (ix) and outputting, to a set of second registers, the normalized residue and the corrected spin as a coordinate pair.

In another embodiment, a computing system for processing three-dimensional (3D) graphics is provided, the computing system comprising: (a) a processor; (b) a graphics processing unit (GPU); and (c) one or more memories, having stored thereon computer-executable instructions for computing modular coordinates for a set of integers representing vertices of a triangle in a three-dimensional (3D) graphical space, relative to a modulus, that when executed, cause the computing system to: (i) retrieve, from the one or more memories, one or more folding constants, wherein the one or more folding constants are precomputed using the modulus; (ii) retrieve, from the one or more memories, a reciprocal constant, wherein the reciprocal constant is precomputed using the modulus; (iii) decompose, via the processor, each integer vertex into binary chunks; (iv) compute, via the processor, an intermediate folded value for each integer vertex, wherein the intermediate folded value is a sum of products of each folding constant and its corresponding binary chunk; (v) normalize, via the processor, the intermediate folded value for each integer vertex by using a bounded number of subtraction operations to obtain a normalized residue; (vi) compute, via the processor, a spin estimate for each integer vertex, wherein the spin estimate comprises one or more high bits of the product of the integer vertex and the reciprocal constant; (vii) obtain, via the processor, a corrected spin from the spin estimate; and (viii) output, via the processor, to the GPU, for each integer vertex the normalized residue and the corrected spin as coordinate pairs.

BRIEF DESCRIPTION OF FIGURES

Non-limiting and non-exhaustive examples are described with reference to the following figures.

FIG. 7A illustrates a mathematical formula for computing one or more folding constants, according to some aspects.

FIG. 7B illustrates a mathematical formula describing an intermediate folded value, according to some aspects.

FIG. 7C illustrates a mathematical formula for computing a reciprocal constant, according to some aspects.

FIG. 7D illustrates a mathematical formula for computing a spin estimate value, according to some aspects.

DETAILED DESCRIPTION

Overview

Figure 1:
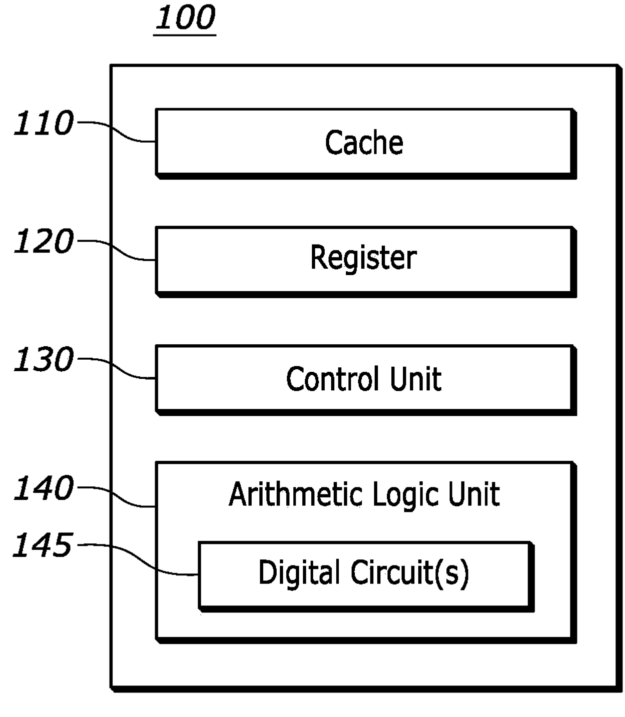
FIG. 1 illustrates a block diagram of an integrated circuit configured to perform divider-less modular arithmetic operations, according to some aspects.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The systems and methods described herein address the technical challenges associated with division-based modular arithmetic in integrated circuits and computing systems. Division operations present substantial performance challenges for integrated circuits due to iterative algorithms that consume multiple clock cycles, disproportionate area and power consumption of dedicated division units, and emulation overhead when hardware division is unavailable. These challenges may also affect computer systems that process computer graphics, where modular arithmetic operations are frequently used for screen wrapping, texture tiling, pattern animation, pixel dithering, and processing polygonal meshes, and where division latency may reduce frame rates and increase rendering times. The modular-based methods and related operations described herein can be referred to, at least in some embodiments, as the "Syzygy Field Fold" approach or technique. The Syzygy Field Fold approach provides a divider-less technique for computing modular coordinates that replaces division operations with multiplication, addition, and bounded subtraction operations in the primary execution path. In some embodiments, the normalized residue and spin are maintained as execution state values and are incrementally updated across successive operations rather than recomputed for each integer. In such embodiments, although the spin after bounded correction may be obtained from high bits of a product, the spin represents a maintained modulus-cycle execution coordinate associated with the integer rather than a value recomputed from the integer for each operation.

The Syzygy Field Fold approach or technique may address the performance degradation experienced by computer systems that rely on modular arithmetic for high-throughput workloads. By precomputing folding constants and a reciprocal constant based on the modulus, the technique enables normalized residue computation and spin estimation followed by bounded correction using fixed-latency arithmetic operations rather than variable-latency division algorithms. The folding constants align with binary chunk boundaries of the integer representation, enabling decomposition of an integer into chunks that can be processed in parallel through multiplication with corresponding folding constants. The sum of these products yields an intermediate folded value that can be reduced to the range between zero and the modulus using a bounded number of subtraction operations rather than iterative division.

Advantages and Improvements

The Syzygy Field Fold approach may provide improvements for computer graphics applications where modular operations are frequently employed for screen wrapping, texture tiling, pattern animation, pixel dithering, and processing polygonal meshes. By avoiding division operations when processing vertex coordinates and texture indices, the technique can reduce frame latency and increase achievable frame rates compared to division-based approaches. The bounded number of correction operations during intermediate folded value normalization and spin estimate correction may provide predictable execution timing that facilitates pipeline scheduling for real-time graphics applications.

The Syzygy Field Fold approach or technique may address the performance degradation experienced by computer systems that rely on modular arithmetic for high-throughput workloads. In particular, a computer implementing an integrated circuit with the Syzygy Field Fold approach benefits from significantly reduced computational cycles relative to division-based modular arithmetic, which means fewer computing steps are required to achieve the same outcome. This decrease in operations may translate to lower power consumption and improved energy efficiency, making the system more suitable for high-performance and low-power applications.

The Syzygy Field Fold technique overcomes limitations of conventional reciprocal-based approaches by establishing a systematic correspondence between binary chunk boundaries of an integer and its modular representation. In some embodiments, the modulus may be selected as a product of small primes that is near a power of two within a predetermined range in some embodiments, which keeps folding constants small relative to the modulus and limits the number of conditional subtractions needed during normalization. This alignment between the modulus and binary structure may enable incremental streaming updates where consecutive integers can be processed by incrementing the residue and conditionally incrementing the spin, rather than recomputing the full folding pipeline for each integer. This improves the operation of an underlying computer implementing the Syzygy Field Fold technique because the underlying computer need not execute a multitude of folding operations of prior art modulus techniques, which are routinely performed by conventional computers.

The Syzygy Field Fold approach can reduce power consumption compared to implementations that include dedicated division hardware. By utilizing existing multiplier circuits for both residue computation through folding constant multiplication and spin extraction through reciprocal constant multiplication, the technique may reduce the total number of functional units required on an integrated circuit. The precomputation of folding constants and the reciprocal constant may amortize the cost of division across many modular coordinate computations, yielding performance improvements for workloads that process large numbers of integers relative to a fixed modulus. This improves on the operation of an underlying computer implementing the Syzygy Field Fold technique because the underlying computer can use reduced power (e.g., in its integrated circuit implementing the Syzygy Field Fold technique) compared to conventional computers that implement prior art modulus techniques.

As used herein, certain terms are defined to clarify how modular coordinates are represented and maintained during execution of the methods and systems described in this disclosure. The term "magnitude" refers to a modular execution state variable representing a current modular value associated with a modulus, which in some embodiments is stored as part of execution state and is directly updated as arithmetic operations are performed, rather than being recomputed from a reconstructed or global numeric value. In some embodiments, the magnitude corresponds to a normalized residue and represents a modular value constrained to a defined interval associated with the modulus, such as the interval [0, W). In the embodiments described herein that maintain a normalized residue as execution state, the magnitude corresponds to the normalized residue. In other embodiments, the magnitude may correspond to a maintained modular execution state that is distinct from, but consistent with, a normalized residue representation. The term "normalized residue" refers to a value obtained by reducing an intermediate folded value, via bounded correction operations to obtain a modular value lying within such a modular range. In such embodiments, the spin may be maintained as execution state and updated incrementally when the magnitude crosses a modular boundary.

The term "spin" refers to an execution state variable associated with progression across modular boundaries corresponding to changes in magnitude, which in some embodiments tracks accumulated transitions when magnitude crosses a modular boundary and is maintained and updated as part of execution state. In some embodiments, the spin is initially estimated using high-order bits of a product of the integer and a reciprocal constant. The spin estimate may be subject to bounded correction operations based on a check value derived from the integer, the modulus, and the spin estimate. When underestimation of the spin is detected via the check value, the spin may be incremented a bounded number of times to obtain a corrected spin. While spin and magnitude may collectively correspond to quantities that are mathematically related to a quotient and a remainder, the invention is not limited to embodiments in which one is derived from the other or recomputed from a combined value and instead spin and magnitude may be stored and updated directly during execution, including during incremental or streaming operations. Magnitude and spin may together form an execution state representing an integer relative to the modulus. This execution state may be maintained and updated incrementally across successive operations, including streaming updates, without recomputing modular coordinates from the original integer value.

Exemplary Integrated Circuit

Referring to FIG. 1, an integrated circuit 100 may be configured to perform divider-less modular arithmetic operations. In some embodiments, the integrated circuit 100 may be implemented within a processor. Additionally, or alternatively, the integrated circuit 100 may be part of a processor or system-on-chip (SoC), for example, designed as part of a processor, where the processor accesses the integrated circuit 100 across a computing bus on a SoC. Additionally, or alternatively, the integrated circuit 100 may be implemented as an application-specific integrated circuit (ASIC) designed for computing modular coordinates for an integer relative to a modulus without performing division operations in a primary execution path. In other embodiments, the integrated circuit 100 may be a general-purpose integrated circuit. The integrated circuit 100 may be incorporated into various computing systems. For example, these computing systems may include personal computers, servers, mobile devices, embedded systems, graphics processing units, network processors, or specialized accelerator cards.

The integrated circuit 100 may include a cache 110. The cache 110 may store data and instructions used in dividerless modular arithmetic computations. In some embodiments, the cache 110 may be implemented as an L1 cache, an L2 cache, or an L3 cache wired onto the integrated circuit 100. In other embodiments, the cache 110 may be implemented as a unified cache. In still other embodiments, the cache 110 may be implemented as a micro-op cache to reduce latency. The cache 110 may provide rapid access to frequently used data during folding operations by storing the data in static random-access memory (SRAM) cells arranged in cache lines. The cache 110 may include cache controller circuitry comprising hardware logic circuits that manage cache line allocation for determining where to store incoming data, eviction policies for selecting which data to remove when the cache is full, and data coherency for maintaining consistency between the cache and main memory. In some embodiments, the cache 110 may employ set-associative mapping that allows data to be placed in multiple cache locations, or direct mapping that assigns each data item to a single fixed cache location, to organize stored constants for retrieval during arithmetic operations.

With continued reference to FIG. 1, the integrated circuit 100 may include a register 120. The register 120 may store operands, intermediate results, and constants used during arithmetic operations. In some embodiments, the register 120 may be implemented as a register file comprising a plurality of flip-flop circuits or latch circuits arranged to hold binary data. The register 120 may hold binary chunks extracted from input integers, folding constants fetched from the cache 110, and computed residue and spin values during execution of a divider-less folding pipeline. The register 120 may include read ports and write ports that allow simultaneous access to multiple register locations during a single clock cycle. In some embodiments, the register 120 may be implemented as a multi-port register file with dedicated ports for source operands and destination operands. In other embodiments, the register 120 may include a plurality or sets of registers included on the integrated circuit 100. For example, this may include one or more registers for storing the integer and the modulus, one or more constant registers for storing folding constants and the reciprocal constant, and one or more output registers for storing the normalized residue and corrected spin. The cache 110 and the register 120 may store various constants used in divider-less modular arithmetic computations. A modulus W may be stored in the cache 110 or the register 120, where, in some embodiments, the modulus W represents a wheel modulus. A wheel modulus may be chosen as a product of small primes. For example, a chosen modulus W may equal 30030, which as a product of small primes is $2\times3\times5\times7\times11\times13$. In another example the modulus W may equal 210, which as a product of small primes is $2\times3\times5\times7$. When the modulus is close to a power of two, the folding constants remain small relative to the modulus W, keeping intermediate sums within a range that does not overflow (where overflow occurs when an arithmetic result exceeds the maximum value that can be stored in a fixed-width register). Further, the intermediate folded value after summing the products of the folding constants and binary chunks is not much larger than the modulus W so only a bounded number of subtractions (e.g., 0-2 in some embodiments) are needed to normalize the residue. In some embodiments, reduction operations may be applied during accumulation of partial products, or after forming the intermediate folded value.

Folding constants may also be stored in the cache 110 or the register 120, where each folding constant represents a value of a fixed binary base raised to a successive power modulo the modulus W. In some embodiments, the integrated circuit 100 may support multiple different moduli W. In some embodiments, the folding constants may include $k_i=2^{B_i}$ modW, where $B_i$ are the bit offsets corresponding to the base positions of the i-th binary chunk. The binary chunks used for decomposing an integer N may be 8-bit, 16-bit, or 32-bit wide, with corresponding adjustments to the number of folding constants and the folding computation. For example, a 64-bit integer being decomposed into four 16-bit binary chunks, the folding constants may include $k_0=2^0$modW (which equals 1), $k_1=2^{16}$ modW, $k_2=2^{32}$ modW, and $k_3=2^{48}$ modW. A reciprocal constant μ may be stored in the cache 110 or the register 120, where the reciprocal constant μ equals $[2^b/W]$, where b is a bit-width, and is precomputed once using division. During runtime, the reciprocal constant is fetched from the cache 110 and loaded into the register 120 before spin computation. The spin may be initially estimated by multiplying the integer by the reciprocal constant and extracting the high-order bits of the product, thereby avoiding division in the runtime execution path.

The register 120 may further include an output register. The output register may store a normalized residue and a corrected spin maintained during execution. In some embodiments, the normalized residue corresponds to a modular remainder of the integer relative to the modulus, mathematically corresponding to r=N mod W, and represents the integer's position within a single modulus cycle. In some embodiments, the corrected spin corresponds to a maintained value consistent with the number of complete modulus cycles associated with the integer, for example consistent with s=[N/W]. Together, the spin and normalized residue form a coordinate pair that may satisfy the invariant $N=s\cdot W+r$ such that the original integer may be reconstructed from the corrected spin, modulus, and normalized residue.

As further shown in FIG. 1, the integrated circuit 100 may include a control unit 130. The control unit 130 may manage overall operation of the integrated circuit 100 and may coordinate a set of instructions for computing modular coordinates for an integer relative to a modulus. The control unit 130 may coordinate flow of data between the cache 110, the register 120, and an arithmetic logic unit 140. The control unit 130 may sequence operations for chunk extraction, folding constant multiplication, residue normalization, and spin calculation according to a divider-less folding method. In some embodiments, the control unit 130 may include a finite state machine that transitions through states corresponding to different stages of the folding pipeline. The control unit 130 may generate control signals on dedicated signal lines that enable signals to activate specific hardware units within the arithmetic logic unit 140. For example, the control unit 130 may assert an enable signal on a multiplier enable line to activate multiplier circuits or assert an enable signal on an adder enable line to activate adder circuits. The control unit 130 may use clock edges to synchronize data transfers between the cache 110, the register 120, and the arithmetic logic unit 140, where data is captured on rising or falling clock edges to maintain timing consistency across the pipeline. The control unit 130 may latch intermediate results into registers between pipeline stages, holding computed values stable while subsequent operations are performed. The control unit 130 may route data through multiplexers by asserting select signals that determine which input paths are connected to output paths, enabling the control unit 130 to direct operands from different sources to the appropriate functional units. The control unit 130 may coordinate the timing of operations across the pipeline stages by generating sequenced control signals that activate each stage in the proper order and duration. The control unit 130 may include instruction decode logic that interprets opcodes and generates microoperations for execution by the arithmetic logic unit 140. In some embodiments, the control unit 130 may implement pipelining to overlap execution of multiple folding operations for increased throughput.

The integrated circuit 100 may include an arithmetic logic unit 140. The arithmetic logic unit 140 may perform mathematical operations for divider-less modular arithmetic, including multiplication of binary chunks by folding constants, addition of partial products, and conditional subtraction for residue normalization. The arithmetic logic unit 140 may also perform multiply-high operations using reciprocal constants for spin computation without division instructions. The arithmetic logic unit 140 may include digital circuit(s) 145 for performing arithmetic computations including multiplication, addition, comparison, and bounded adjustment operations used in the divider-less folding pipeline.

In some embodiments, the digital circuit(s) 145 may include multiplier circuits implemented as array multipliers, Wallace tree multipliers, or Booth multipliers. Array multipliers may generate partial products by performing bitwise AND operations between each bit of the multiplicand and each bit of the multiplier, then sum the partial products using rows of adder cells arranged in a grid pattern. Wallace tree multipliers may reduce the partial products using layers of carry-save adders that compress three input values into two output values at each layer, reducing the number of summands logarithmically until a final two-operand addition produces the product. Booth multipliers may encode groups of multiplier bits to reduce the number of partial products by representing sequences of ones as a subtraction at the least significant position and an addition at the most significant position of the sequence.

The digital circuit(s) 145 may include adder circuits implemented as carry-lookahead adders, carry-save adders, or ripple-carry adders. Carry-lookahead adders may compute carry signals in parallel by generating propagate and generate signals for each bit position, then combining these signals through lookahead logic to determine all carry bits simultaneously rather than waiting for carries to ripple through each bit position sequentially. Carry-save adders may accept three input operands and produce two output operands (a sum and a carry vector) without propagating carries, allowing multiple partial products to be accumulated with minimal delay before a final carry-propagating addition. Ripple-carry adders may propagate carry signals sequentially from the least significant bit to the most significant bit, where each full adder cell waits for the carry output of the previous cell before computing its sum and carry outputs.

The digital circuit(s) 145 may include comparator circuits that compare operand values and generate condition flags. Comparator circuits may perform bitwise comparison starting from the most significant bit, propagating an equality signal downward and asserting a greater-than or less-than output when a bit position differs between the two operands. The condition flags generated by the comparator circuits may include a zero-flag indicating equality, a carry flag indicating unsigned overflow, and a sign flag indicating the result of a signed comparison.

For bounded adjustment operations used in residue normalization, the digital circuit(s) 145 may include one or more stages of multiplexer circuits controlled by the comparison result, where each multiplexer selects between the original value and a subtracted value based on whether the comparator determined that the residue was greater than or equal to the modulus, thereby enabling application of a bounded number of conditional subtraction operations. For multiply-high operations used in spin computation, the multiplier circuits may produce a double-width product (for example, a 128-bit product from two 64-bit operands), and extraction logic may select the upper half of the product by routing the high-order bits to the output while discarding the low-order bits.

In operation, the integrated circuit 100 may execute a divider-less modular arithmetic computation by coordinating the cache 110, the register 120, the control unit 130, and the arithmetic logic unit 140 through a sequence of pipelined stages. When an integer N is presented for modular coordinate computation, the control unit 130 may first initiate a fetch operation to retrieve the folding constants and the reciprocal constant from the cache 110 and load these values into the register 120. The control unit 130 may then activate the hardwired splitter circuitry within the arithmetic logic unit 140 to decompose the integer N into binary chunks, where routing specific bit ranges of the integer may perform the decomposition to separate output paths without requiring arithmetic operations. Once the binary chunks are available, the control unit 130 may assert enable signals to activate the multiplier circuits within the digital circuit(s) 145, causing each binary chunk to be multiplied by its corresponding folding constant in parallel. The partial products may then be routed to the adder circuits, which sum the products to produce an intermediate folded value. The control unit 130 may subsequently activate the comparator circuits determine whether the intermediate folded value or an accumulated partial sum reaches or exceeds the modulus W, and based on the comparison result, the digital circuit(s) 145 may apply a bounded number of conditional subtraction operations (e.g., 0-2 subtractions) to obtain the normalized residue. In a parallel or subsequent pipeline stage, the control unit 130 may initiate spin computation by activating the multiplier circuits to compute the product of the integer N and the reciprocal constant μ, after which extraction logic may route the high-order bits of the double-width product to produce the spin estimate value. The control unit 130 may apply bounded corrections to the spin estimate value using additional comparison and bounded adjustment operations before outputting the normalized residue and corrected spin as a coordinate pair to an output register.

The divider-less folding approach implemented on the integrated circuit 100 may provide several advantages for modular arithmetic computations. By avoiding division operations in the primary execution path, the integrated circuit 100 may reduce the latency associated with computing modular coordinates compared to conventional division-based approaches. Division circuits typically require multiple clock cycles to complete iterative algorithms, whereas the folding approach may complete residue and spin computations using multiplication and addition operations that execute in fewer clock cycles.

The integrated circuit 100 may achieve improved throughput by enabling multiple modular coordinate computations to be executed concurrently through the pipeline. Because the folding operations rely on fixed-latency multiplier and adder circuits rather than variable-latency division circuits, the control unit 130 may schedule successive computations at regular intervals without stalling the pipeline. In some cases, multiple integers may be processed concurrently through different stages of the folding pipeline, increasing the number of modular coordinate pairs produced per unit time.

The integrated circuit 100 may reduce power consumption compared to implementations that include dedicated division hardware. Division circuits occupy substantial die area and consume power during iterative computation cycles. By replacing division with multiplication-based folding and reciprocal constant operations, the integrated circuit 100 may utilize existing multiplier circuits for both residue computation and spin extraction, potentially reducing the total number of functional units required on the die.

The precomputation of folding constants and reciprocal constants may enable the integrated circuit 100 to amortize the cost of division across many modular coordinate computations. The division operation used to compute the reciprocal constant μ is performed once during initialization and stored in the cache 110, after which all subsequent spin computations use multiplication rather than division. In workloads that process large numbers of integers relative to a fixed modulus, this amortization may yield substantial performance improvements.

The streaming update mechanism supported by the integrated circuit 100 may provide additional benefits for sequential integer processing. When processing consecutive integers, the integrated circuit 100 may increment the residue and conditionally increment the spin using simple addition and comparison operations rather than recomputing the full folding pipeline for each integer. This incremental update approach may reduce the computational cost per integer in streaming workloads such as sieving operations or sequential data processing.

The described registers, circuitry, and data-path configuration are exemplary embodiments, and other circuitry, execution units, or hardware logic configured to perform the disclosed operations may be used without departing from the scope of the invention.

Exemplary Block Diagram

Figure 2:
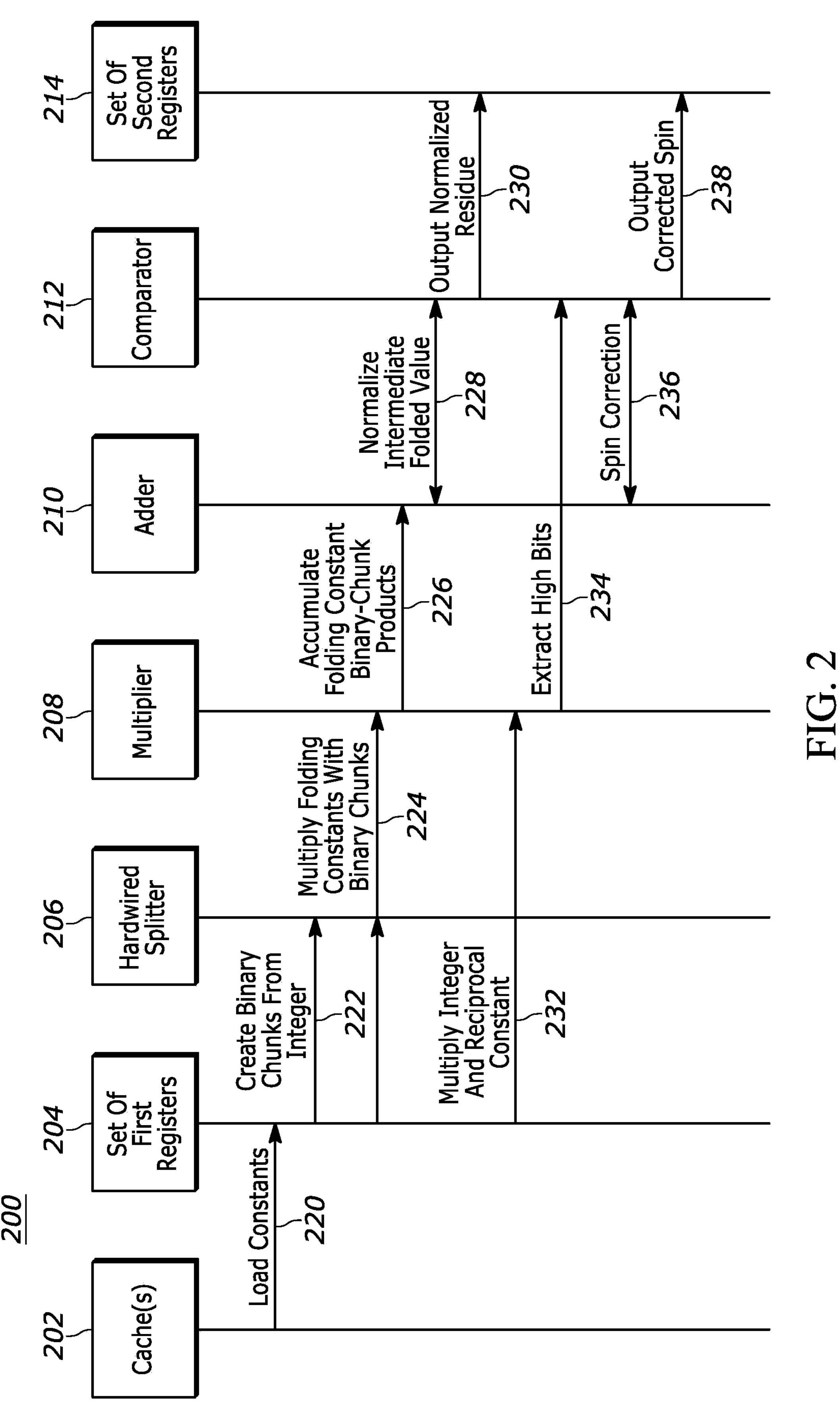
FIG. 2 illustrates a block diagram of a divider-less modular arithmetic computation pipeline, according to some aspects.

Referring to FIG. 2, a block diagram may represent an example divider-less modular arithmetic computation pipeline 200. The block diagram may illustrate the interaction flow between hardware components for computing residue and spin coordinates without performing division operations in a primary execution path, according to some aspects. The block diagram may reference elements of FIG. 1, where components in the block diagram may correspond to or be implemented within the integrated circuit 100, the cache 110, the register 120, the control unit 130, and the arithmetic logic unit 140 described with respect to FIG. 1.

The example pipeline 200 may include the use of a cache 202. The cache 202 may store precomputed constants used in divider-less modular arithmetic computations, including folding constants and a reciprocal constant. The cache 202 may be implemented as described with respect to the cache 110 of FIG. 1, using SRAM cells arranged in cache lines with cache controller circuitry for managing data retrieval.

The example pipeline 200 may include the use of a set of first registers 204. The set of first registers 204 may store operands and constants loaded from the cache 202 for use during arithmetic operations. The set of first registers 204 may hold the integer, the modulus, the one or more folding constants, and the reciprocal constant during execution of the divider-less folding pipeline. The set of first registers 204 may be implemented as a set of register files comprising flip-flop circuits or latch circuits as described with respect to the register 120 of FIG. 1.

The example pipeline 200 may include the use of a hardwired splitter 206. The hardwired splitter 206 may decompose an input integer into binary chunks using wired shifter/splitter logic or barrel-shifter logic. For example, the hardwired splitter 206 may be implemented as direct wiring connections that route specific bit ranges of the input integer to separate output paths without requiring arithmetic operations or microcode. The hardwired splitter 206 may contain no arithmetic operations and no microcode for extracting binary chunks from the input integer. For a 64-bit integer, the hardwired splitter 206 may extract four 16-bit chunks designated as $a_0$, $a_1$, $a_2$, and $a_3$ from bit positions [15:0], [31:16], [47:32], and [63:48] respectively. The hardwired splitter 206 may route specific bit ranges of the integer to separate output paths through direct wiring connections.

The example pipeline 200 may include the use of a multiplier 208. The multiplier 208 may perform multiplication operations for computing products of binary chunks and folding constants. In some embodiments, the multiplier 208 may also perform multiply-high operations for spin computation using the reciprocal constant. In other embodiments, multiple multipliers may be used to perform multiplication and multiply-high operations. The multiplier 208 may be implemented as described with respect to the digital circuit(s) 145 of FIG. 1.

The example pipeline 200 may include the use of an adder 210. The adder 210 may sum partial products produced by the multiplier 208 to generate an intermediate folded value. The adder 210 may be implemented using carry-lookahead adders, carry-save adders, or ripple-carry adders as described with respect to the digital circuit(s) 145 of FIG. 1.

The example pipeline 200 may include the use of a comparator 212. The comparator 212 may compare operand values and generate condition flags for determining whether the intermediate folded value reaches or exceeds the modulus or whether spin corrections are needed. The comparator 212 may perform bit-wise comparison and assert greater-than or less-than outputs based on the comparison result. The comparator 212 may be implemented as described with respect to the digital circuit(s) 145 of FIG. 1.

The example pipeline 200 may include the use of a set of second registers 214. The set of second registers 214 may store the normalized residue and corrected spin values produced by the divider-less folding pipeline. The set of second registers 214 may latch the coordinate pair for subsequent use by other processing units.

With continued reference to FIG. 2, the example pipeline 200 may load constants from the cache 202 to the set of first registers 204 (220). When loading the constants 220, the cache 202 may transfer the one or more folding constants and the reciprocal constant to the set of first registers 204. In some embodiments, the modulus is also provided to the set of first registers 204 and/or made available to the comparator 212 for comparisons during normalization and correction. The one or more folding constants may be precomputed using the modulus, and the reciprocal constant may be precomputed using the modulus. Loading the constants 220 may correspond to fetching, from the cache 202, the one or more folding constants and the reciprocal constant.

The example pipeline 200 may decompose the integer into binary chunks using the hardwired splitter 206 (222). When creating the binary chunks 222 of the integer, the hardwired splitter 206 may decompose the integer into binary chunks. Creating the binary chunks 222 of the integer may correspond to decomposing, using one or more hardwired operations, the integer into binary chunks. For example, creating the binary chunks 222 may involve extracting four 16-bit chunks from a 64-bit integer without performing arithmetic operations.

The example pipeline 200 may multiply the binary chunks by the folding constants using the multiplier 208 (224). Before multiplying the folding constants 224, the multiplier 208 may receive the binary chunks from the hardwired splitter 206 and the folding constants from the set of first registers 204. Multiplying the folding constants may involve computing in parallel, using one or more multipliers, the product of each folding constant and its corresponding binary chunk. For example, when multiplying the folding constants, four parallel multipliers may be used to simultaneously compute the products $p_0$, $p_1$, $p_2$, and $p_3$.

The example pipeline 200 may accumulate the products of the binary chunks and folding constants using the adder 210 (226). When accumulating the folding constant binary chunk products, the adder 210 may receive the partial products from the multiplier 208 and sum the products together to produce an intermediate folded value. Accumulating the folding constant binary chunk products may involve computing $r_{raw}=p_0+p_1+p_2+p_3$.

The example pipeline 200 may normalize the intermediate folded value using the adder 210 and the comparator 212 a bounded number of times (e.g., 0-2 in some embodiments) to obtain a normalized residue less than the modulus (228). When normalizing the intermediate folded value 228, the comparator 212 may determine whether the intermediate folded value reaches or exceeds the modulus, and the adder 210 may perform bounded adjustment operations to reduce the intermediate folded value to within the range [0, W). This may involve a bounded compare-and-subtract loop (e.g., 0-2 iterations) in which the comparator 212 evaluates the current value and the adder 210 produces an updated value that is re-evaluated. In other embodiments, the bounded correction may be implemented using a fixed number of staged conditional subtraction operations without an explicit feedback loop. In some embodiments, such normalization may be applied during accumulation of partial products, or after forming the intermediate folded value. Normalizing the intermediate folded value may involve subtracting the modulus W from the intermediate folded value a bounded number of times (e.g., 0-2 in some embodiments) to obtain a normalized residue within the range [0, W).

The example pipeline 200 may output the normalized residue to the set of second registers 214 (230). When outputting the normalized residue 230, after operations by the comparator 212, the normalized residue value may be transferred to the set of second registers 214. Outputting the normalized residue 230 may involve latching the normalized residue for subsequent retrieval.

The example pipeline 200 may include a parallel processing path for spin computation. The example pipeline 200 may multiply the integer by the reciprocal constant using the multiplier 208 (232). When multiplying the integer and reciprocal constant 232, the set of first registers 204 may provide the integer and the reciprocal constant to the multiplier 208. The multiplier 208 may compute the product of the integer N and the reciprocal constant μ to produce a double-width product.

The example pipeline 200 may extract the high bits from the double-width product using the multiplier 208 (234). When extracting the high bits from the double-width product 234, the multiplier 208 may generate a double-width product and route the high-order bits to the comparator 212 to produce a spin estimate. For a 64-bit integer multiplied by a 64-bit reciprocal constant, this may involve selecting the upper 64 bits of the 128-bit product.

The example pipeline 200 may apply bounded corrections to the spin estimate using the comparator 212 (236). When applying bounded corrections to the spin estimate 236, the comparator 212 may receive the extracted high bits and evaluate a check value derived from the integer, the modulus, and the spin estimate to determine whether the spin estimate underestimates [N/W] consistent with a modular coordinate relationship between the spin, the modulus, and the residue (and, in some embodiments, satisfying the identity N=s·W+r). In some embodiments, when overestimation is detected, bounded corrections may additionally include decrementing the spin estimate a bounded number of times to obtain the corrected spin. Applying bounded corrections to the spin estimate may involve incrementing the spin estimate, using arithmetic logic (e.g., using the arithmetic logic unit 140 of FIG. 1), a bounded number of times when such underestimation is detected. In other embodiments, bounded corrections involve the one or more digital circuits generating a check value derived from the integer, the modulus, and the spin estimate and the comparator 212 evaluates the check value to determine whether bounded correction is applied.

The example pipeline 200 may output the corrected spin to the set of second registers 214 (238). When outputting the corrected spin 238, after operations by the comparator 212, the corrected spin value may be transferred to the set of second registers 214. Outputting the corrected spin 238 may latch the corrected spin coordinate alongside the normalized residue to form the complete coordinate pair representing the integer relative to the modulus as maintained execution state. In some embodiments, the example pipeline 200 may execute the residue computation path and the spin computation path concurrently to produce the coordinate pair with reduced latency. The cache 202 may supply the precomputed folding constants and reciprocal constant to the set of first registers 204 at the beginning of the computation. The hardwired splitter 206 may then decompose the input integer into binary chunks, which are routed to the multiplier 208 for parallel multiplication with the corresponding folding constants. The adder 210 may accumulate the partial products to form the intermediate folded value, and the comparator 212 may determine whether conditional subtractions are needed to bring the intermediate folded value within the valid range.

Simultaneously, the multiplier 208 may compute the product of the integer and the reciprocal constant, and the extraction logic may select the high-order bits to produce the spin estimate. The comparator 212 may apply bounded corrections to the spin estimate before the set of second registers 214 latches both the normalized residue and the corrected spin as the final coordinate pair. The output coordinate pair may represent the integer in a form where the corrected spin indicates progression across modulus cycles and the normalized residue indicates position within a modulus cycle. The pipeline architecture of the example pipeline 200 may provide several advantages for modular arithmetic computations within an integrated circuit (e.g., the integrated circuit 100) architecture. The parallel execution of residue and spin computation paths may reduce overall latency compared to sequential approaches that compute the residue first and then derive the spin or vice versa. The use of hardwired splitting logic may eliminate the need for shift instructions or arithmetic operations during chunk extraction, reducing both cycle count and power consumption. The bounded correction mechanism for both residue normalization and spin adjustment may provide predictable execution timing, which may facilitate pipeline scheduling and avoid variable-latency stalls that can occur with iterative division algorithms. The precomputation and caching of folding constants and reciprocal constants may enable the pipeline to process multiple integers relative to the same modulus without repeated constant generation overhead. In some cases, the pipeline may be replicated to process multiple integers simultaneously, increasing throughput for workloads that require high-volume modular coordinate computations.

The described pipeline architecture, component arrangement, and data-path configuration represent exemplary embodiments, and other configurations may be used without departing from the scope of the invention. Additional circuit configurations, register allocation schemes, or control sequencing approaches may be employed in alternative embodiments.

Exemplary Method for Computing Divider-less Modular Coordinates

Figure 3:
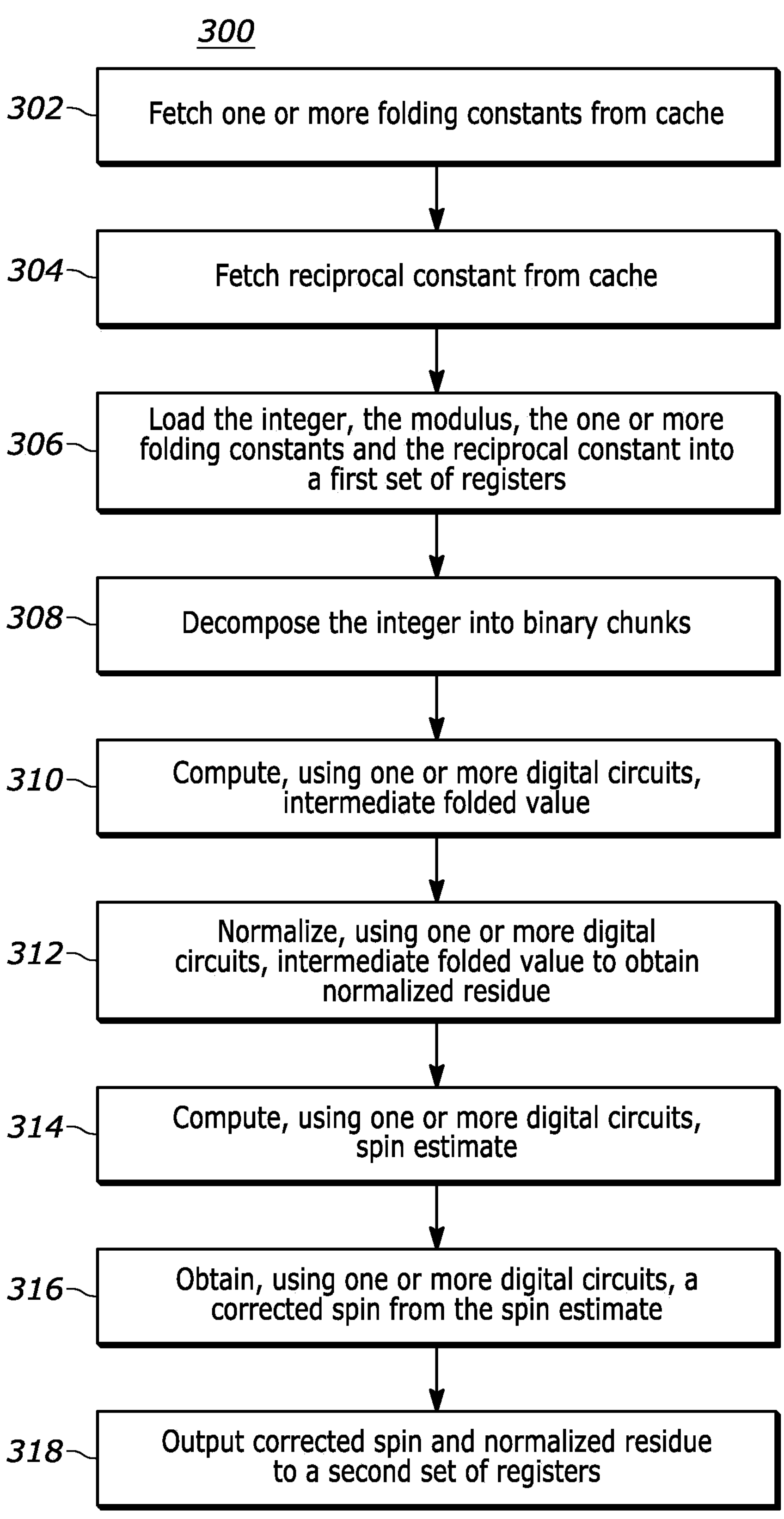
FIG. 3 illustrates a flowchart for a method for computing divider-less modular coordinates, according to some aspects.

Referring to FIG. 3, a method 300 for computing divider-less modular coordinates may be performed by the integrated circuit 100 of FIG. 1 or by components of the example pipeline 200 of FIG. 2. The method 300 may transform an integer into a coordinate pair comprising a normalized residue and a spin without performing division operations in a primary execution path.

The method 300 may include fetching one or more folding constants from a cache (e.g., the cache 110 of FIG. 1 or the cache 202 of FIG. 2) (step 302). This step may involve the cache providing the precomputed folding constants to a first set of registers (e.g., the set of first registers 204 of FIG. 2). The one or more folding constants may include values representing a fixed binary base raised to successive powers modulo the modulus W, such as $k_0=2^0 \bmod W=1$, $k_1=2^{16} \bmod W$, $k_2=2^{32} \bmod W$, and $k_3=2^{48} \bmod W$ for 16-bit binary chunks.

The method 300 may include fetching a reciprocal constant from the cache (step 304). This step may involve the cache providing the precomputed reciprocal constant μ to the first set of registers. The reciprocal constant μ may be computed as $\mu=[2^b/W]$ where b is a bit-width and stored in the set of first registers for use in spin computation. The reciprocal constant μ may be precomputed once using division and stored in the cache, enabling subsequent spin computations to avoid division operations.

With continued reference to FIG. 3, the method 300 may include loading the integer, the modulus, the one or more folding constants, and the reciprocal constant into a set of first registers (step 306). This step may involve the set of first registers receiving and storing the operands and constants for use during subsequent arithmetic operations. The set of first registers may hold these values in flip-flop circuits or latch circuits for rapid access by the arithmetic logic unit (e.g., the arithmetic logic unit 140 of FIG. 1).

The method 300 may include decomposing the integer into binary chunks (step 308). This step may involve a hardwired splitter (e.g., the hardwired splitter 206 of FIG. 2) decomposing the integer into binary chunks using wired shifter/splitter logic. For a 64-bit integer, the hardwired splitter may extract four 16-bit chunks designated as $a_0$, $a_1$, $a_2$, and $a_3$ from bit positions [15:0], [31:16], [47:32], and [63:48] respectively. The hardwired splitter may route specific bit ranges of the integer to separate output paths through direct wiring connections without performing arithmetic operations.

The method 300 may include computing an intermediate folded value using one or more digital circuits (e.g., the digital circuit(s) 145 of FIG. 1) (step 310). This step may involve a multiplier (e.g., the multiplier 208 of FIG. 2) computing the product between each folding constant and its corresponding binary chunk. An adder (e.g., the adder 210 of FIG. 2) may then compute the intermediate folded value as the sum of the product between each folding constant and its corresponding binary chunk. For example, the intermediate folded value may be computed as $r_{raw}=a_0*k_0+a_1*k_1+a_2*k_2+a_3*k_3$.

The method 300 may include normalizing the intermediate folded value using one or more digital circuits (step 312). This step may involve determining, using a comparator (e.g., the comparator 212 of FIG. 2) whether the intermediate folded value reaches or exceeds the modulus W, and the adder may perform bounded adjustment operations to reduce the intermediate folded value to within the range [0, W). In some embodiments, the conditional subtraction normalization step may require a bounded number of subtractions (e.g., 0-2 in some embodiments) of W to bring the intermediate folded value into the range [0, W) when W is chosen to be sufficiently close to a power of two. This step may involve a bounded number of subtraction operations to normalize the intermediate folded value, without requiring division in the primary execution path. In some embodiments, normalization may be applied during accumulation of partial products, or after forming the intermediate folded value.

The method 300 may include computing a spin estimate using one or more digital circuits (step 314). This step may involve the multiplier computing the product of the integer N and the reciprocal constant μ, producing a double-width product (e.g., a 128-bit product from two 64-bit operands). Extraction logic may then select the upper half of the double-width product (e.g., the upper 64 bits) by routing the high-order bits to the output while discarding the low-order bits. The extracted high bits yield the spin estimate, which may then be subject to bounded corrections by the comparator. In some embodiments, bounded correction may include incrementing the spin estimate a bounded number of times when underestimation is detected based on a check value derived from the integer, the modulus, and the spin estimate (and, in some embodiments, optionally the normalized residue). The method 300 may include obtaining a corrected spin from the spin estimate using the one or more digital circuits (step 316). This step may involve determining whether the spin estimate requires correction based on a check value derived from the integer, the modulus, and the spin estimate. When the product of the spin estimate and the modulus is greater than the integer, the one or more digital circuits may decrement the spin estimate by a bounded number of times. When the product of the spin estimate incremented by one and the modulus is less than or equal to the integer, the one or more digital circuits may increment the spin estimate by a bounded number of times. In some embodiments, the correction may require a bounded number of corrective decrements or corrective increments if the spin estimate is too high, or a bounded number of corrective increments if the spin estimate is too low. In other embodiments, the reciprocal constant is selected such that the spin estimate underestimates the true spin, enabling increment-only correction. In still other embodiments the reciprocal constant may permit overestimation, requiring bounded decrement and/or increment correction.

The method 300 may include outputting the corrected spin and normalized residue to the second set of registers (e.g., the set of second registers 214 of FIG. 2) (step 318). This step may involve the second set of registers latching the normalized residue and the corrected spin as a coordinate pair. This step may also involve outputting to the second set of registers the normalized residue and the corrected spin as a coordinate pair. The coordinate pair may represent the integer relative to the modulus, where the corrected spin indicates progression across modulus cycles and the normalized residue indicates position within a modulus cycle.

In some embodiments, the method 300 may be performed in different sequential orders than depicted in FIG. 3. For example, step 302 and step 304 may be performed in parallel or in reverse order. In other embodiments, one or more steps of the method 300 may be omitted, combined with other steps, or replaced with alternative operations that achieve equivalent results. The method 300 may be implemented using different hardware components, software modules, or combinations than those described with respect to FIG. 1 and FIG. 2.

In operation, the method 300 may enable computation of modular coordinates without performing division in the primary execution path. The precomputation and caching of folding constants and the reciprocal constants may amortize the cost of division across many modular coordinate computations. The bounded number of subtraction operations may provide predictable execution timing, facilitating pipeline scheduling and avoiding variable-latency stalls associated with iterative division algorithms.

The method 300 provides a technical improvement in computer operation by producing bounded modular coordinate values using precomputed constants and correction operations, reducing reliance on division or modulus re-computation.

Exemplary Residue Folding Pipeline

Figure 4:
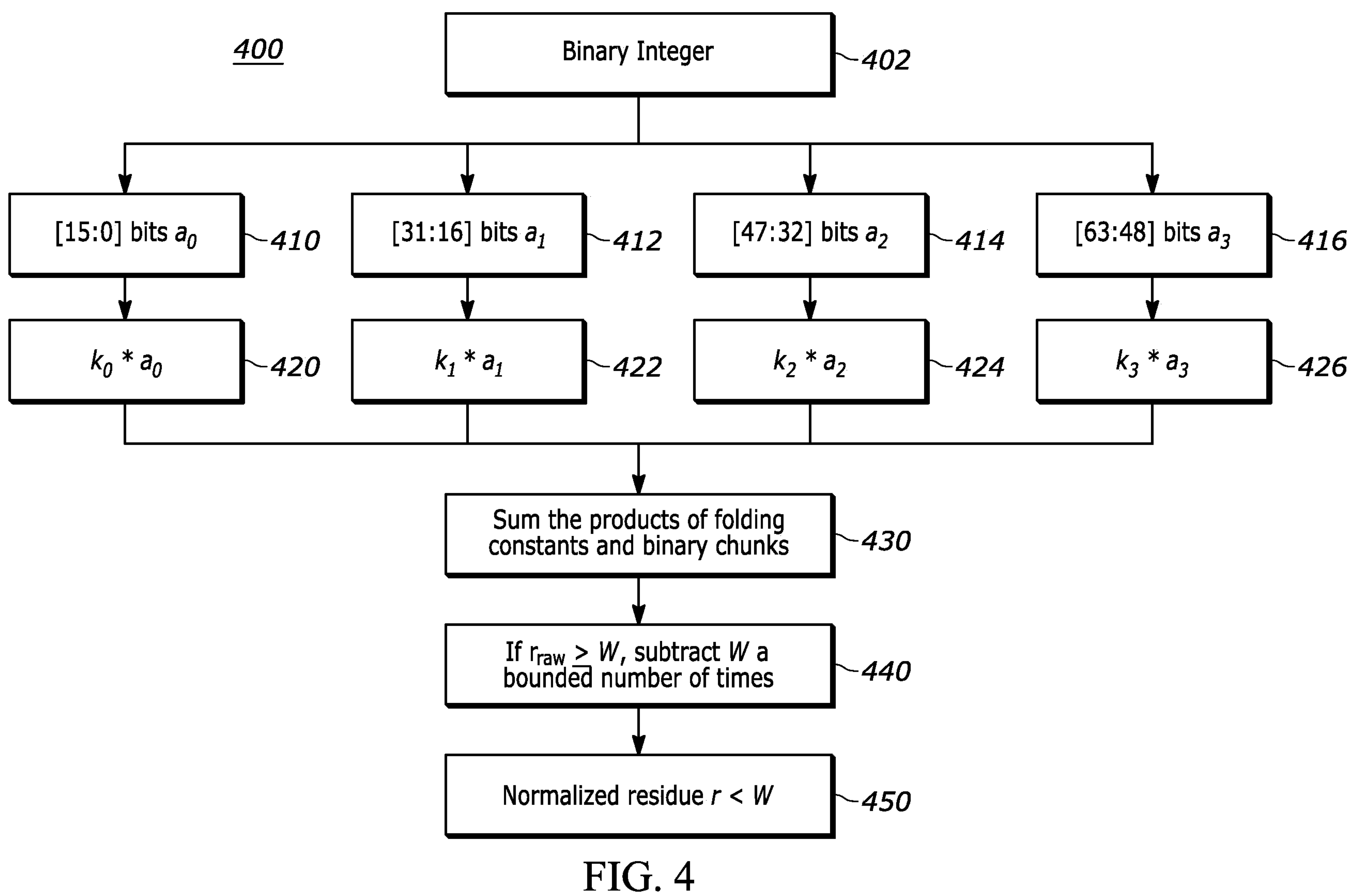
FIG. 4 illustrates a flowchart for a method for computing a normalized residue using divider-less folding of a binary integer, according to some aspects.

Referring to FIG. 4, an exemplary residue folding pipeline 400 may transform a 64-bit binary integer into a normalized residue relative to a modulus W using divider-less folding. The exemplary residue folding pipeline 400 may be implemented using components of the integrated circuit 100 of FIG. 1 or the example pipeline 200 of FIG. 2. The example of FIG. 4 is meant to be exemplary and not limiting in scope. The exemplary residue folding pipeline 400 may be implemented using different bit-widths without departing from the scope of the invention.

The exemplary residue folding pipeline 400 may begin with binary integer (e.g., a 64-bit binary integer) provided as the input (block 402). This step may involve the binary integer being received by a hardwired splitter (e.g., the hardwired splitter 206 of FIG. 2) for decomposition into binary chunks. The binary integer may represent any integer value to be transformed into modular coordinates.

With continued reference to FIG. 4, the exemplary residue folding pipeline 400 may decompose the binary integer into four binary chunks in parallel. For example, using a 64-bit integer and 16-bit binary chunks, a first binary chunk 410 may comprise bits [15:0] extracted as do, a second binary chunk 412 may comprise bits [31:16] extracted as $a_1$, a third binary chunk 414 may comprise bits [47:32] extracted as $a_2$, and a fourth binary chunk 416 may comprise bits [63:48] extracted as $a_3$. The extraction of the first binary chunk 410, the second binary chunk 412, the third binary chunk 414, and the fourth binary chunk 416 may be performed in parallel using a hardwired splitter (e.g., the hardwired splitter 206 of FIG. 2), which routes specific bit ranges to separate output paths through direct wiring connections without requiring arithmetic operations.

The exemplary residue folding pipeline 400 may multiply each binary chunk by a corresponding folding constant in parallel. A first folding constant binary chunk product 420 may comprise $p_0=k_0*a_0$, a second folding constant binary chunk product 422 may comprise $p_1=k_1*a_1$, a third folding constant binary chunk product 424 may comprise $p_2=k_2*a_2$, and a fourth folding constant binary chunk product 426 may comprise $p_3=k_3*a_3$. The computation of the first folding constant binary chunk product 420, the second folding constant binary chunk product 422, the third folding constant binary chunk product 424, and the fourth folding constant binary chunk product 426 may be performed in parallel using a multiplier (e.g., the multiplier 208 of FIG. 2). In some embodiments, the one or more folding constants may be equal to the remainders of a base corresponding to the size of the binary chunks, taken to an integer power corresponding to the number of binary chunks, modulo the modulus. For 16-bit binary chunks, the folding constants may include $k_0=2^{\circ}\text{mod}W=1$, $k_1=2^{16}$ modW, $k_2=2^{32}$ modW, and $k_3=2^{48}$ modW.

As further shown in FIG. 4, the exemplary residue folding pipeline 400 may compute a sum of products of folding constants and binary chunks 430. This step may involve an adder (e.g., the adder 210 of FIG. 2) computing $r_{raw}=p_0+p_1+p_2+p_3$ to produce an intermediate folded value. In some embodiments, this may be done using a multiply-accumulate (MAC) structure or adder tree. The computation of the sum product of folding constants and binary chunks 430 may use addition and multiplication with no division present. In some embodiments, one or more partial products may be reduced modulo the modulus during accumulation, and/or intermediate reductions may be applied prior to completion of the full summation. The sum of products of folding constants and binary chunks 430 may represent an intermediate folded value that reaches or exceeds the modulus W.

The exemplary residue folding pipeline 400 may proceed to an intermediate folded value correction 440. Intermediate folded value correction (block 440) may involve a comparator (e.g., comparator 212 of FIG. 2) determining whether $r_{raw}\geq W$ and, when $r_{raw}\geq W$, triggering subtraction of W. The conditional subtraction may be applied a bounded number of times to normalize the result. In some embodiments, the modulus W may be the product of one or more small prime integers and may be approximate to a power of two. In some embodiments, when the modulus W is chosen to be sufficiently close to a power of two, the intermediate folded value correction 440 may subtract W a bounded number of times (e.g., a small bounded number of times) to bring the intermediate folded value into the range [0, W).

The exemplary residue folding pipeline 400 may conclude with a final residue 450. The normalized residue value r may be output, where r is less than W. The final residue 450 may be stored in an output register (e.g., the set of second registers 214 of FIG. 2) for subsequent use. The final residue 450 may represent the integer modulo the modulus W, computed without performing division operations in the primary execution path. In some embodiments, consecutive-integer updates may be performed by updating maintained modular execution-state values, while the normalized residue and corrected spin values provide the primary maintained execution state for streaming updates without recomputing the folding pipeline for each successive integer.

Exemplary Streaming Update Logic

Figure 5:
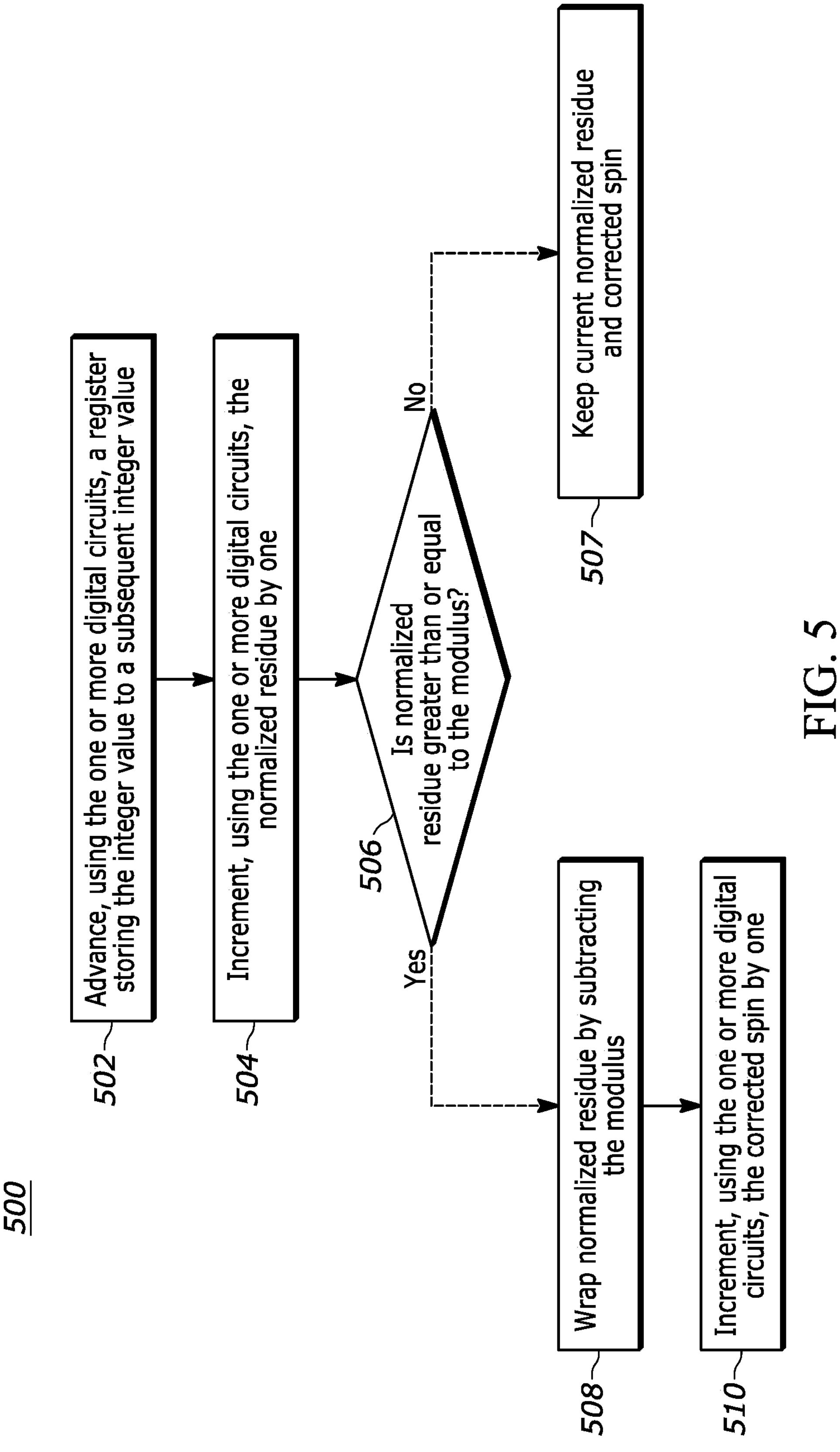
FIG. 5 illustrates a flowchart for a method for maintaining modular coordinates during streaming updates, according to some aspects.

Referring to FIG. 5, an example streaming update logic 500 may incrementally update residue and spin coordinates when processing consecutive integers without recomputing the full folding pipeline. The example streaming update logic 500 may be implemented using components of the integrated circuit 100 of FIG. 1 or the example pipeline 200 of FIG. 2.

In some embodiments, the residue and spin values are maintained as primary execution state and are updated incrementally for consecutive integers, as illustrated in FIG. 5. In other embodiments, residue and spin values are derived on a per-integer basis via folding and reciprocal-based computation, and streaming update logic is not employed. The streaming update mechanisms described herein are optional embodiments and are not required for implementations that compute modular coordinates independently for each integer value.

The example streaming update logic 500 may include one or more digital circuits (e.g., the digital circuit(s) 145 of FIG. 1) advancing a register storing the integer value to a subsequent integer value (step 502). This step may involve updating the integer value from a current value N to a subsequent value N+1.

The example streaming update logic 500 may use the one or more digital circuits to increment the normalized residue by one (step 504). This step may involve incrementing the normalized residue value r from a current value to r+1. The increment operation may be performed independently of the binary representation of the integer, avoiding involvement of binary carries that would otherwise propagate through the integer representation. In some embodiments, consecutive-integer updates may be performed by updating maintained modular execution-state values, while the magnitude (represented by the normalized residue) and the spin values provide the maintained execution state for streaming updates without recomputing the folding pipeline for each successive integer.

With continued reference to FIG. 5, the example streaming update logic 500 may include using a comparator (e.g., the comparator 212 of FIG. 2) to determine if the normalized residue is greater than or equal to the modulus (step 506). This step may involve comparing, using the comparator, the incremented normalized residue value against the modulus W and generating a condition flag indicating whether the normalized residue is greater than or equal to the modulus. The comparison may be performed using bitwise comparison logic that generates condition flags indicating whether the normalized residue is greater than or equal to the modulus. This step may further involve evaluating the condition flag generated by the comparator to determine which branch of the streaming update logic is executed.

If the normalized residue is less than the modulus (No branch from step 506), the example streaming update logic 500 may include keeping the current normalized residue and corrected spin (step 507). This step may involve the normalized residue and corrected spin values remaining unchanged in the output register (e.g., the set of second registers 214 of FIG. 2), and the streaming update for the current integer may be complete. The coordinate pair (r, s) may continue to represent the integer relative to the modulus without modification to the corrected spin value.

If the normalized residue is greater than or equal to the modulus (Yes branch from step 506), the example streaming update logic 500 may include wrapping the normalized residue (step 508). Wrapping the normalized residue may involve subtracting the modulus from the incremented residue when the incremented residue reaches or exceeds the modulus, thereby returning the residue to a value within the range [0, W) and preserving the modular execution state across consecutive-integer updates. Wrapping the normalized residue may result in an update to the set of second registers (e.g., the set of second registers 214 of FIG. 2).

The example streaming update logic 500 may include incrementing the corrected spin by one using the one or more digital circuits (step 510). This step may involve incrementing the corrected spin value s from a current value to s+1, indicating that an additional complete modulus cycle has been traversed. The increment operation may use an adder circuit to perform a single addition operation on the register storing the corrected spin (e.g., the set of second registers 214).

In some embodiments, the example streaming update logic 500 may maintain the execution state invariant N=s*W+r for a sequence of integer values without performing division operations. The coordinate pairs are updated incrementally across successive inputs, maintaining exactness over extended sequences while reducing computational overhead relative to re-computation-based approaches. The streaming update mechanism may maintain correctness for a sufficiently large number of sequential updates relative to the maintained execution state, without requiring re-synchronization of the residue-spin coordinate representation. The operations may provide deterministic execution timing that facilitates pipeline scheduling for high-throughput streaming workloads.

In some embodiments, a hardware implementation may include a dedicated streaming update circuit that maintains residue and spin without recomputing the full folding path for consecutive integer sequences. The dedicated streaming update circuit may bypass the chunk extraction, folding constant multiplication, and summation stages of the exemplary residue folding pipeline 400 of FIG. 4 when processing consecutive integers. The dedicated streaming update circuit may include a residue increment register, a spin increment register, and comparison logic that detects when the residue is greater than or equal to the modulus and triggers the residue reset and spin increment operations. When the residue reaches the modulus, it indicates that a complete modulus cycle has been traversed, so the residue resets to zero and the spin increments by one to reflect the additional cycle.

In some embodiments, a hardware arithmetic unit (e.g., the arithmetic logic unit 140 of FIG. 1) may include an instruction configured to increment residue and spin in a fixed and predictable number of clock cycles for streaming workloads. The instructions may execute the operations of FIG. 5 within a fixed number of clock cycles regardless of the integer value or the modulus. The constant-time execution may enable predictable throughput for streaming applications such as sieving operations, sequential data processing, or counter-based workloads that process large sequences of consecutive integers.

In some embodiments, the method 500 may be performed in different sequential orders than depicted in FIG. 5. In other embodiments, one or more steps of the method 500 may be omitted, combined with other steps, or replaced with alternative operations that achieve equivalent results. The method 500 may be implemented using different hardware components, software modules, or combinations than those described with respect to FIG. 1 and FIG. 2.

Exemplary Computing Environment

Figure 6:
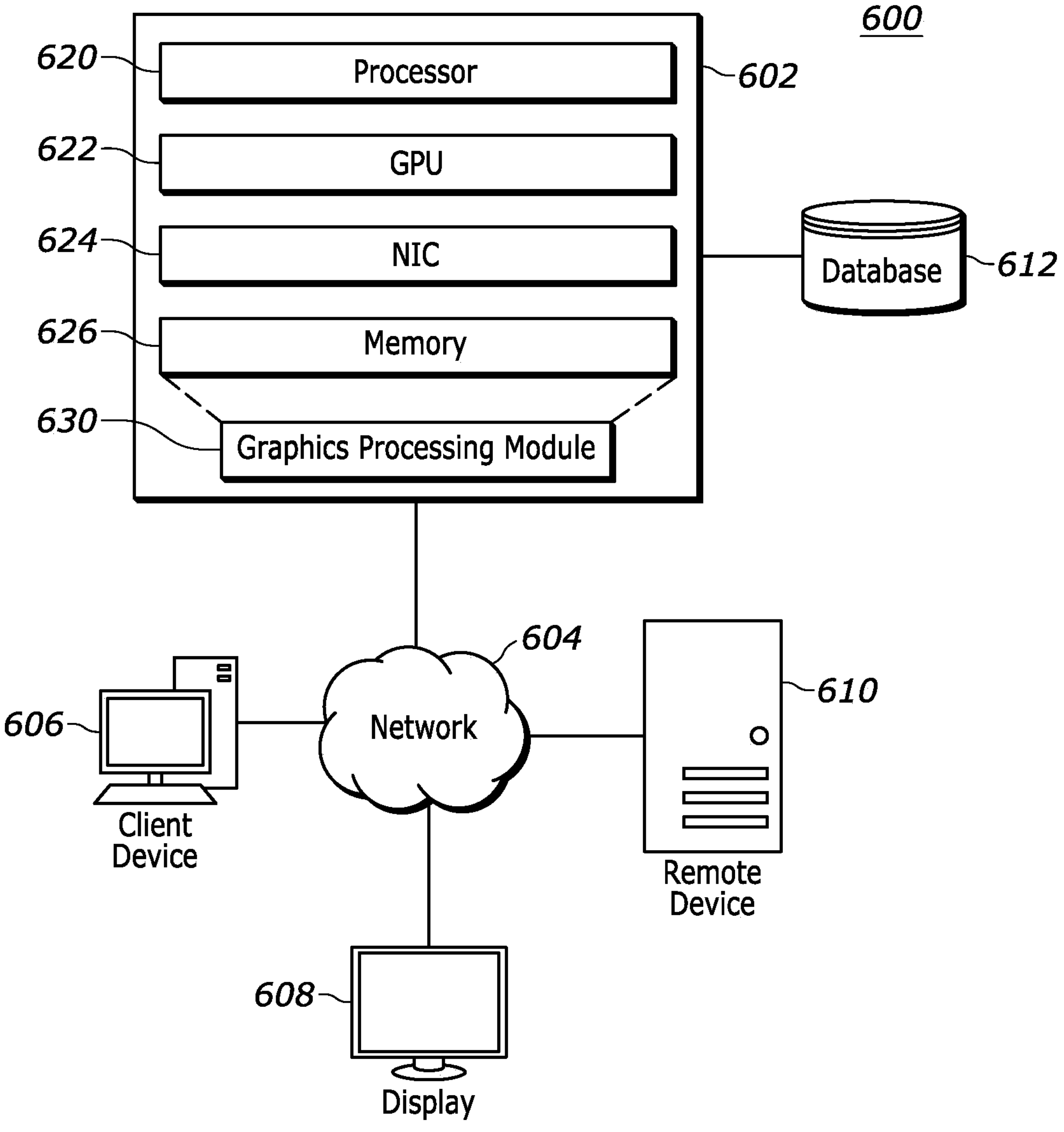
FIG. 6 illustrates a block diagram of a system configured to perform divider-less modular arithmetic operations, according to some aspects.

Referring to FIG. 6, a computing environment 600 may be configured to perform divider-less modular arithmetic operations, including in graphics-related workloads such as three-dimensional (3D) graphics. The computing environment 600 may comprise hardware and software components arranged to compute modular coordinates for integers without performing division operations in a primary execution path. The computing environment 600 may support distributed processing of modular arithmetic computations across multiple interconnected devices. In some embodiments, the computing environment 600 may be implemented as a cloud computing infrastructure, an enterprise data center, a local area network installation, or a combination of on-premises and cloud-based resources. The computing environment 600 may enable computation of residue and spin coordinate pairs for sets of integers representing vertices of triangles in a three-dimensional graphical space relative to a modulus.

With continued reference to FIG. 6, the computing environment 600 may comprise a distributed computing infrastructure configured to perform divider-less modular arithmetic operations for processing three-dimensional (3D) graphics. The computing environment 600 may include interconnected hardware components and software modules arranged to compute modular coordinates for sets of integers representing vertices of triangles in a three-dimensional graphical space relative to a modulus. In some embodiments, the computing environment 600 may be implemented as a cloud computing infrastructure comprising geographically distributed data centers connected through high-bandwidth network links, an enterprise data center comprising rack-mounted servers with shared storage systems, a local area network installation comprising workstations and servers connected through Ethernet switches, or a hybrid configuration combining on-premises computing resources with cloud-based processing capabilities. The computing environment 600 may support parallel processing of modular arithmetic computations across multiple processing units, enabling high-throughput computation of residue and spin coordinate pairs for large datasets of integer values. In some embodiments, the computing environment 600 may implement load balancing mechanisms that distribute modular coordinate computation tasks across available processing resources based on current utilization levels and task priorities. Although three-dimensional graphics processing is used as an illustrative example, the computing environment 600 may be configured to perform divider-less modular arithmetic for non-graphics workloads including cryptography, indexing, simulation, numerical analysis, and data processing.

The computing environment 600 may include a computing system 602. The computing system 602 may be implemented as a personal computer, a workstation, an embedded system, a mobile device, or a cloud computing instance. In some embodiments, the computing system 602 may comprise a rack-mounted server chassis containing one or more processor modules, memory modules, storage devices, and network interface hardware. In other embodiments, the computing system 602 may be implemented as a blade server inserted into a blade enclosure that provides shared power, cooling, and network connectivity. In other embodiments, the computing system 602 may be implemented as a tower server, a high-density micro-server, or a converged infrastructure appliance that integrates compute, storage, and networking functions. The computing system 602 may execute an operating system such as Linux, Windows Server, or a real-time operating system that manages hardware resources and provides execution environments for modular arithmetic software. The computing system 602 may host virtualization software that creates multiple virtual machines, each capable of executing independent modular arithmetic workloads with isolated memory spaces and processing allocations. In some embodiments, the computing environment 600 may be a standalone system without database 612 or network 604.

The computing system 602 may include a processor 620. The processor 620 may perform general-purpose processing operations including decomposition of integers into binary chunks and computation of normalized residue values using folding constants and computation of spin values using the reciprocal constant followed by bounded correction to obtain a corrected spin. In some embodiments, the processor may be a central processing unit (CPU). The processor 620 may be implemented as a multi-core processor. In some embodiments, the processor 620 may be implemented as an x86-64 (e.g., Intel 64, AMD64), an ARM architecture processor, a RISC-V architecture processor, or a POWER architecture processor. The processor 620 may include single instruction multiple data (SIMD) execution units that perform parallel arithmetic operations on multiple data elements simultaneously. For example, the processor 620 may include Advanced Vector Extensions (AVX) units, Streaming SIMD Extensions (SSE) units, or NEON units that execute multiplication and addition operations on vectors of 4, 8, or 16 integer values in a single instruction cycle. The SIMD execution units may enable optimization of multiplication and polynomial map operations by processing multiple binary chunks or multiple integers concurrently through the folding pipeline. In operation, the processor 620 may be used to perform arithmetic operations on the computing system 602.

The computing system 602 may include a graphics processing unit (GPU) 622. The GPU 622 may handle graphics processing tasks and receive modular coordinate outputs from the processor 620 for rendering or other computational operations. The GPU 622 may be implemented as a discrete graphics card connected to the computing system 602 through a Peripheral Component Interconnect Express (PCIe) interface, or as an integrated graphics processor sharing the same semiconductor die or package with the processor 620. The GPU 622 may comprise thousands of processing cores organized into streaming multiprocessors or compute units, where each streaming multiprocessor contains multiple arithmetic logic units, shared memory, and register files. In some embodiments, the GPU 622 may be a commercially available GPU (e.g., NVIDIA Geforce, AMD Radeon, Intel Arc) and may support graphics APIs such as OpenGL, Vulkan, or DirectX, as well as compute APIs such as CUDA or OpenCL. The GPU 622 may receive coordinate pairs comprising normalized residues and spins from the processor 620 and use these coordinates for vertex transformation, texture mapping, shading calculations, or other graphics pipeline operations. The GPU 622 may store received coordinate pairs in video random-access memory (VRAM) for rapid access during rendering operations.

The computing system 602 may include a network interface controller (NIC) 624. The NIC 624 may provide network connectivity enabling the computing system 602 to communicate with other devices over a network. In some embodiments, the NIC 624 may be implemented as an Ethernet adapter. In other embodiments, the NIC 624 may be implemented as a wireless network adapter supporting Wi-Fi protocols such as IEEE 802.11ax or IEEE 802.11be. The NIC 624 may include a media access controller that manages access to the network medium, a physical layer transceiver that converts digital signals to analog signals for transmission, and direct memory access (DMA) engines that transfer network packets between the NIC 624 and system memory without processor intervention. The NIC 624 may support hardware offload features such as TCP segmentation offload, checksum offload, and receive-side scaling that distribute network processing across multiple processor cores.

The computing system 602 may include a memory 626. The memory 626 may store data and instructions including folding constants, reciprocal constants, and intermediate results used during divider-less modular arithmetic computations. The memory 626 may be implemented as dynamic random-access memory (DRAM) modules installed in memory slots on a motherboard of the computing system 602. In some embodiments, the memory 626 may comprise DDR4 or DDR5 synchronous DRAM modules with capacities ranging from 8 gigabytes to 256 gigabytes per module. The memory 626 may be organized into memory channels that provide parallel data paths between the processor 620 and the memory modules, increasing aggregate memory bandwidth. The memory 626 may store computer-executable instructions that, when executed by the processor 620, cause the computing system 602 to perform divider-less modular arithmetic operations including retrieval of folding constants and reciprocal constants, decomposition of integers into binary chunks, computation of residues and spins, and output of coordinate pairs to the GPU 622. The memory 626 may also store software libraries implementing the divider-less folding method in programming languages such as C++, Rust, Go, or Python, with plugin application programming interfaces (APIs) for high-level map operations including multiplication, squaring, and polynomial updates.

The computing system 602 may include a graphics processing module 630. The graphics processing module 630 may be implemented as computer-executable instructions stored on the memory 626 and executed by the processor 620 and/or the GPU 622. The graphics processing module 630 may coordinate graphics-related operations and interface with the GPU 622 to process modular coordinates for visualization or geometric calculations. In some embodiments, the graphics processing module 630 may be a software/driver component executed by processor 620 and/or GPU 622. The graphics processing module 630 may translate high-level graphics commands into low-level GPU instructions, manage GPU memory allocation, and synchronize data transfers between system memory and GPU memory. The graphics processing module 630 may receive coordinate pairs comprising normalized residues and spins from the processor 620 and format these coordinates for consumption by GPU shader programs. In some embodiments, the graphics processing module 630 may use the coordinate pairs to perform graphics operations including screen wrapping, texture tiling, pattern animation, pixel dithering, and processing polygonal meshes. In other embodiments, the graphics processing module 630 may be configured to project three-dimensional (3D) computer graphics onto a two-dimensional (2D) display (such as the display 608). Vertex coordinates representing vertices of triangles in a three-dimensional graphical space may be processed through the folding pipeline to compute modular coordinates. The coordinate pairs may be used to index into wheel-based lookup tables, drive periodic or circular geometry, and control shader or animation logic via residues and spins. In some embodiments, the residue may act as an angle-like coordinate around the wheel for sectorized coordinate systems, where the wheel is divided into arcs or sectors and the residue selects which sector an integer belongs to. In other embodiments, the graphics processing module 630 may implement a multi-wheel architecture that stacks multiple wheel moduli to enable multi-precision modular arithmetic suitable for cryptographic applications or high-precision geometric calculations. The graphics processing module 630 may maintain separate sets of folding constants and reciprocal constants for each wheel modulus in the multi-wheel stack.

The computing environment 600 may include a database 612. The database 612 may be connected to the computing system 602 and store persistent data such as precomputed folding constants, reciprocal constants for various moduli, and results of modular arithmetic operations. In some embodiments, the database 612 may be implemented as a relational database management system (e.g., PostgreSQL, MySQL, or Microsoft SQL Server), or as a non-relational database (e.g., MongoDB, Redis, or Apache Cassandra). In other embodiments, the database 612 may be implemented as a cloud-based database service (e.g., Amazon RDS, Google Cloud SQL, or Microsoft Azure SQL Database). The database 612 may store folding constant tables indexed by modulus value, enabling rapid retrieval of precomputed constants when the computing system 602 processes integers relative to different moduli. The database 612 may store reciprocal constants computed for commonly used moduli, avoiding repeated computation of these values. The database 612 may be implemented on dedicated storage hardware connected to the computing system 602 through a storage area network (SAN), network-attached storage (NAS), or direct-attached storage (DAS). In some embodiments, the database 612 may be implemented as a distributed database spanning multiple storage nodes for increased capacity and fault tolerance.

The computing environment 600 may include a network 604. The network 604 may facilitate communication between the computing system 602 and external devices (e.g., client device 606, display 608, remote device 610). The network 604 may be implemented as a local area network (LAN) using Ethernet switches and cabling, a wide area network (WAN) using routers and leased lines, the Internet using Internet Protocol (IP) routing, or a combination of these network types. The network 604 may support network protocols including Transmission Control Protocol (TCP) for reliable data delivery, User Datagram Protocol (UDP) for low-latency data delivery, and Hypertext Transfer Protocol (HTTP) or HTTP Secure (HTTPS) for application-layer communication. The network 604 may include network infrastructure devices such as routers that forward packets between network segments, switches that forward frames within network segments, and firewalls that filter traffic based on security policies.

The computing environment 600 may include a client device 606 connected to the network 604. The client device 606 may send requests to the computing system 602 for modular arithmetic computations or receive processed results. The client device 606 may be implemented as a desktop computer, a laptop computer, a tablet computer, a smartphone, or a thin client terminal. The client device 606 may execute client software that communicates with the computing system 602 using remote procedure calls (RPC), representational state transfer (REST) APIs, or WebSocket connections. The client device 606 may submit sets of integers representing vertices of triangles in a three-dimensional graphical space to the computing system 602 for modular coordinate computation and receive coordinate pairs comprising normalized residues and spins in response.

The computing environment 600 may include a display 608 connected to the network 604. The display 608 may present visual output generated from modular coordinate computations performed by the computing system 602. The display 608 may be implemented as a liquid crystal display (LCD) monitor, an organic light-emitting diode (OLED) monitor, a light-emitting diode (LED) monitor, or a projection display. The display 608 may receive rendered graphics frames from the GPU 622 through a display interface such as DisplayPort, High-Definition Multimedia Interface (HDMI), or USB Type-C with DisplayPort Alternate Mode. The display 608 may present three-dimensional graphics scenes where vertex positions have been processed using divider-less modular arithmetic to compute periodic or cyclic geometric transformations.

The computing environment 600 may include a remote device 610 connected to the network 604. The remote device 610 may enable remote access to computational capabilities of the computing system 602. The remote device 610 may be implemented as a desktop computer, a laptop computer, a tablet computer, a smartphone, a thin client terminal, a gaming console, a graphics workstation, a rendering farm, a cloud gaming instance, a virtual reality (VR) headset, an augmented reality (AR) device, or an Internet of Things (IoT) device that accesses modular arithmetic services provided by the computing system 602. In some embodiments, the remote device 610 may be implemented as a specialized graphics machine (e.g., NVIDIA DGX, AMD Instinct, Intel Data Center GPU systems) configured for high-performance rendering or geometric calculations using modular coordinates. The remote device 610 may communicate with the computing system 602 through secure network connections using Transport Layer Security (TLS) encryption or virtual private network (VPN) tunnels.

In operation, the computing environment 600 may enable distributed divider-less modular arithmetic processing where the computing system 602 performs folding-based computations and communicates results to connected devices through the network 604. When the client device 606 submits a request to compute modular coordinates for a set of integers representing vertices of a triangle, the processor 620 may retrieve folding constants and the reciprocal constant from the memory 626 or the database 612. The processor 620 may decompose each integer vertex into binary chunks, compute residues using the folding method, normalize the residues using bounded subtraction operations, and compute a spin estimate using multiply-high operations with the reciprocal constant, followed by bounded correction to obtain a corrected spin. The processor 620 may output the normalized residues and corrected spins as coordinate pairs to the GPU 622 through the graphics processing module 630. The GPU 622 may use the coordinate pairs for rendering operations, and the rendered output may be transmitted through the network 604 to the display 608 for presentation.

The computing environment 600 may provide several improvements for modular arithmetic processing in graphics applications. For example, the computing system 602 may reduce latency for modular coordinate computation by avoiding division operations in the primary execution path, enabling faster vertex processing for real-time graphics applications. The computing system 602 may increase throughput by enabling the processor 620 to use SIMD instructions for parallel processing of multiple integer vertices simultaneously through the folding pipeline. The computing system 602 may reduce power consumption compared to implementations that use dedicated division hardware, as the folding method relies on multiplication and addition operations that may consume less energy per operation than iterative division algorithms. The computing environment 600 may enable scalable processing by distributing modular arithmetic workloads across multiple computing systems 602 connected through the network 604, supporting graphics applications that process large numbers of vertices. The computing environment 600 may support flexible deployment through software library implementations in C++, Rust, Go, or Python with plugin APIs, enabling integration of divider-less modular arithmetic into existing graphics processing pipelines without hardware modifications.

The computing environment 600 is meant to be illustrative and not limiting in scope. The computing environment 600 and computing system 602 may be applied to different use cases, and include different hardware components (e.g., processing hardware) and/or software components without departing from the scope of the invention.

Exemplary Mathematical Framework

FIG. 7A, FIG. 7B, FIG. 7C, and FIG. 7D illustrate equations 700 that may define mathematical relationships for divider-less modular arithmetic operations. The equations 700 may specify formulas for computing folding constants, intermediate folded values, reciprocal constants, and spin estimate values used in the divider-less folding pipeline. The equations 700 may be implemented by the computing system 602 of FIG. 6, where the processor 620 executes computer-executable instructions that perform calculations according to the equations 700.

FIG. 7A illustrates a folding constant equation 702-A. The folding constant equation 702-A may define how folding constants are computed for a given modulus. The folding constant equation 702-A may be expressed as:

$$k_i = 2^{B_i} \bmod W$$

where $k_i$ are the one or more folding constants, $B_i$ are the starting bit positions for the binary chunk i, and W is the modulus. For a 64-bit integer decomposed into four 16-bit binary chunks, the folding constant equation 702-A may yield $k_0=2^{\circ}\text{mod}W=1$, $k_1=2^{16}$ modW, $k_2=2^{32}$ modW, and $k_3=2^{48}$ modW. The folding constants may be precomputed once for a given modulus and stored in the memory 626 for retrieval during runtime operations. The computing system 602 may retrieve, from the memory 626, the one or more folding constants computed according to the folding constant equation 702-A.

FIG. 7B illustrates an intermediate folded value equation 702-B. The intermediate folded value equation 702-B may define how an intermediate folded value is computed from binary chunks and folding constants. The intermediate folded value equation 702-B for a 64 bit integer may be expressed as:

$$r_{raw} = \sum_{i=0}^{n-1} \alpha_i k_i$$

where $r_{raw}$ is the intermediate folded value prior to normalization, n corresponds to the number of binary chunks derived from the bit-width of the integer and the chosen chunk size, and at are the one or more binary chunks extracted from the integer. The intermediate folded value equation 702-B may specify that the intermediate folded value is computed as the sum of the product between each folding constant and its corresponding binary chunk. The computing system 602 may compute the intermediate folded value for the integer according to the intermediate folded value equation 702-B.

FIG. 7C illustrates a reciprocal constant equation 702-C. The reciprocal constant equation 702-C may define how a reciprocal constant is computed for a given modulus and bit-width. The reciprocal constant equation 702-C may be expressed as:

$$\mu = \left\lfloor \frac{2^b}{W} \right\rfloor$$

where μ is the reciprocal constant, b is a selected bit-width, and W is the modulus. In some embodiments, the selected bit-width b corresponds to the bit-width of the integer. For example, using a 64-bit integer, the reciprocal constant equation 702-C may yield $\mu=[2^{64}/W]$. The reciprocal constant may be precomputed once using division and stored in the memory 626 or the database 612, enabling subsequent spin computations to avoid division operations in the primary execution path. The computing system 602 may retrieve, from the memory 626, the reciprocal constant computed according to the reciprocal constant equation 702-C.

FIG. 7D illustrates a spin equation 702-D. The spin equation 702-D may define how an initial spin value is computed using the reciprocal constant. The spin equation 702-D may be expressed as:

$$s_{est} = \text{HIGH}(N * \mu)$$

where $s_{est}$ is the spin estimate, N is the integer, μ is the reciprocal constant, and HIGH is a high-bit extraction operator that returns the upper bits of a double-width product. In some embodiments, HIGH (N·μ) corresponds to extracting the most significant bits of the product consistent with the effective bit-width used to compute the reciprocal constant, and may be equivalent to $$\left\lfloor \frac{(N * \mu)}{2^b} \right\rfloor$$

when the reciprocal constant μ is computed using a selected bit-width b that matches the operand width of N. The high-bit multiplication operator may extract the upper half of a double-width product. For a 64-bit integer multiplied by a 64-bit reciprocal constant, the high-bit multiplication operator may select the upper 64 bits of the resulting 128-bit product. In some embodiments, the spin estimate value may be adjusted by a bounded number of increment operations based on a residual comparison to obtain a corrected spin. The computing system 602 may compute the spin estimate for each integer according to the spin equation 702-D, where the spin estimate is the high bits of the product of the integer and the reciprocal constant. In some embodiments, bounded correction of the spin estimate may include increment and/or decrement operations depending on the selected reciprocal constant and correction strategy, while in other embodiments the reciprocal constant is selected such that the spin estimate underestimates the true value, enabling increment-only correction.

The equations 700 may enable divider-less modular arithmetic operations that achieve performance improvements compared to division-based approaches. The performance improvements may result from replacing division operations with multiplication, addition, and bounded adjustment operations that execute in fewer clock cycles on the processor 620. In graphical processing operations, these performance improvements may enable higher frame rates, reduced latency for real-time rendering, and more efficient processing of vertex coordinates in 3D graphics applications.

Exemplary Triangular Mesh

Figure 8:
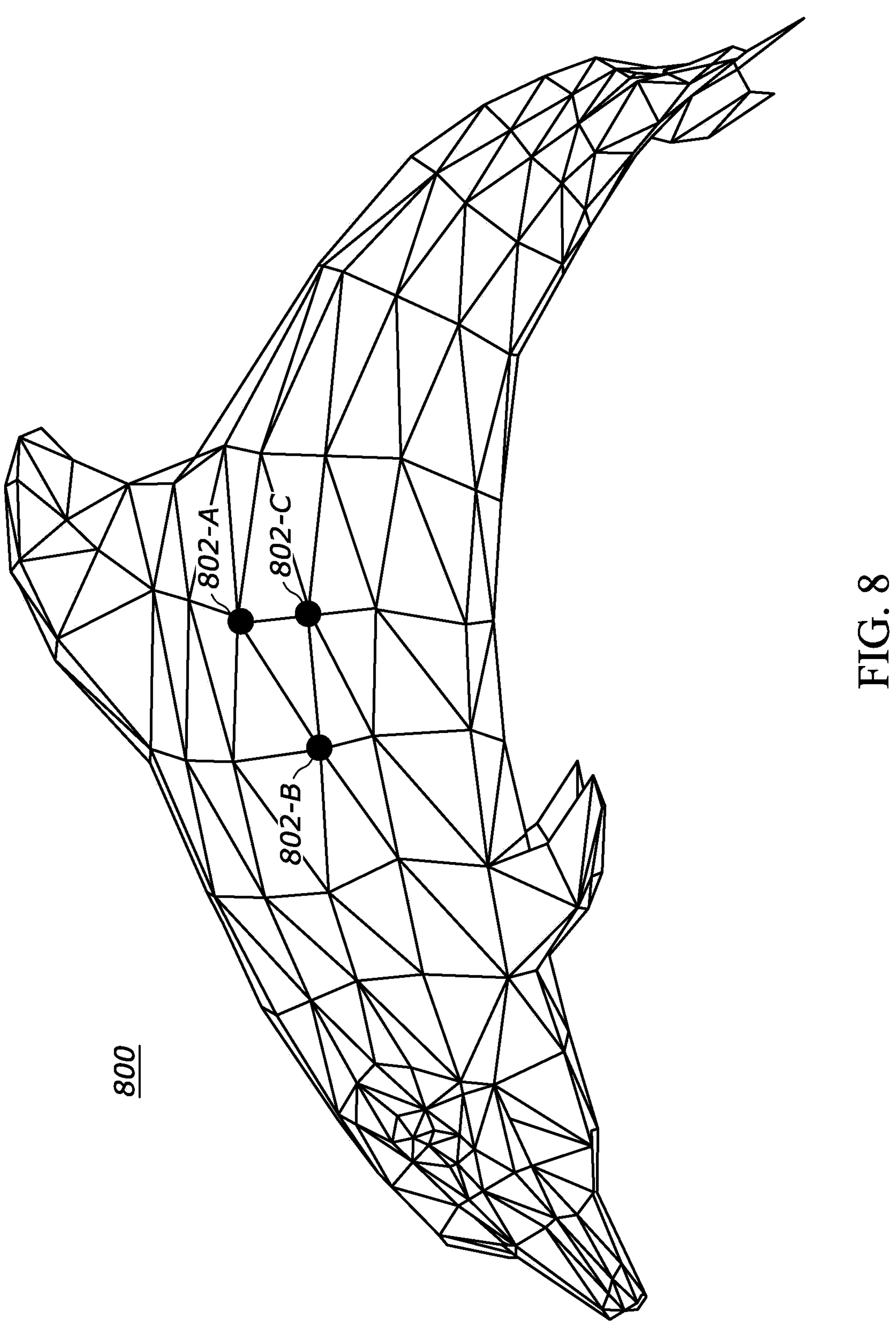
FIG. 8 illustrates an isometric view of a triangular mesh model representing a three-dimensional (3D) shape, according to some aspects.

Referring to FIG. 8, a triangular mesh model 800 may represent a three-dimensional shape using interconnected triangular faces. The triangular mesh model 800 may demonstrate how complex geometric surfaces can be approximated using a collection of triangular primitives, where each triangle is defined by three vertices. The triangular mesh model 800 may be processed by the computing system 602 of FIG. 6, where the processor 620 computes modular coordinates for integer values representing vertex positions and the GPU 622 renders the resulting three-dimensional graphics.

The triangular mesh model 800 may include a first vertex 802-A, a second vertex 802-B, and a third vertex 802-C that together define a single triangular face on the surface of the three-dimensional shape. The first vertex 802-A, the second vertex 802-B, and the third vertex 802-C may each be represented as one or more integer coordinate components encoding spatial position.

With continued reference to FIG. 8, the triangular mesh model 800 may comprise numerous triangular faces of varying sizes that approximate curved surfaces of the three-dimensional shape. Smaller triangles may be used in areas of higher surface curvature to provide finer geometric detail, while larger triangles may be used in areas of lower curvature where less detail is needed. The triangular mesh depicted is one example, and the same overall shape may be represented with finer or coarser detail by increasing or decreasing the number of triangular faces. Each triangular face in the triangular mesh model 800 may be defined by three vertices, and each vertex may be represented as one or more integer values that encode the vertex position in three-dimensional space.

As further shown in FIG. 8, the coordinate pairs computed for the first vertex 802-A, the second vertex 802-B, and the third vertex 802-C may be used by the GPU 622 to perform graphical processing operations. The GPU 622 may use the coordinate pairs to perform a graphical processing operation, wherein the graphical processing operation includes screen wrapping, texture tiling, pattern animation, pixel dithering, or processing a polygonal mesh. The residue component of each coordinate pair may provide a position within a single modulus cycle, while the corrected spin component may indicate how many complete modulus cycles are contained within the original integer value.

In some embodiments, the graphical processing operation may be configured to project a three-dimensional object onto a two-dimensional display (e.g., the display 608). The graphics processing module 630 may receive the coordinate pairs from the processor 620 and format the coordinate pairs for consumption by GPU shader programs. The GPU 622 may use the coordinate pairs for vertex transformation operations that map three-dimensional vertex positions to two-dimensional screen coordinates. The display 608 may present the rendered output of the triangular mesh model 800 as a two-dimensional image representing the three-dimensional shape.

The folding method may be applied to graphics workloads where multiple vertex values of geometric primitives such as triangles are converted to modular coordinates. For the triangular mesh model 800, each of the first vertex 802-A, the second vertex 802-B, and the third vertex 802-C may be processed through the same divider-less folding pipeline. The processor 620 may process multiple vertices concurrently using SIMD instructions that perform parallel arithmetic operations on vectors of integer values. The coordinate pairs produced for each vertex may be stored in the memory 626 or transmitted directly to the GPU 622 for rendering operations.

In some embodiments, the modulus may be logically partitioned into multiple sector ranges (e.g., six sector ranges in hexagonal-style coordinate systems). The six sector ranges may divide the interval into equal-width slices, where each sector corresponds to a range of normalized residue values. Sector assignment may use scaled comparisons without general-purpose division, where a scaling factor may be implemented using a reciprocal constant and a multiply-high operation analogous to the spin computation. The residue component of the coordinate pair may act as a cyclic or phase-like coordinate around the wheel, and the sector index may select which of the six hexagonal slices the integer belongs to. The hexagonal-style coordinate system may be used for texture mapping, procedural pattern generation, or other graphics operations that benefit from periodic or cyclic coordinate representations.

The coordinate pairs computed for vertices of the triangular mesh model 800 may enable several graphics processing operations. Modular coordinates may be particularly useful for these operations because the residue and corrected spin components enable periodic or cyclic behavior that is fundamental to graphics rendering. The residue component may represent a position within a repeating cycle, while the corrected spin component may track how many complete cycles have occurred, allowing graphics operations to seamlessly handle values that wrap around or repeat. For screen wrapping, the residue component may determine the wrapped position of a vertex when the vertex position exceeds screen boundaries, enabling seamless tiling of graphics elements without requiring general-purpose division operations. For texture tiling, the residue component may index into texture coordinates that repeat across the surface of the triangular mesh model 800, where the periodic nature of the residue naturally maps to repeating texture patterns. For pattern animation, the corrected spin component may track the number of complete animation cycles, while the residue component may determine the current position within an animation cycle, enabling smooth looping animations. For pixel dithering, the residue component may provide pseudo-random offsets for pixel positions based on the modular coordinate representation. For processing the triangular mesh model 800, the coordinate pairs may be used to compute vertex positions, normal vectors, or texture coordinates that define the geometry of the three-dimensional shape. The coordinate pairs may also be used when projecting 3D objects onto 2D displays, where the modular representation may facilitate efficient computation of screen-space coordinates from world-space vertex positions.

The divider-less folding approach may provide performance improvements for processing the triangular mesh model 800 compared to division-based approaches. The processor 620 may compute coordinate pairs for multiple vertices without executing division instructions in the primary execution path, reducing latency for vertex processing. The bounded number of subtraction operations during residue normalization may provide predictable execution timing, facilitating pipeline scheduling for real-time graphics applications. The precomputation of folding constants and reciprocal constants may amortize the cost of division across many vertex coordinate computations, improving throughput for graphics workloads that process large numbers of vertices in the triangular mesh model 800.

Exemplary Method for Computing Divider-less Modular Coordinates

Figure 9:
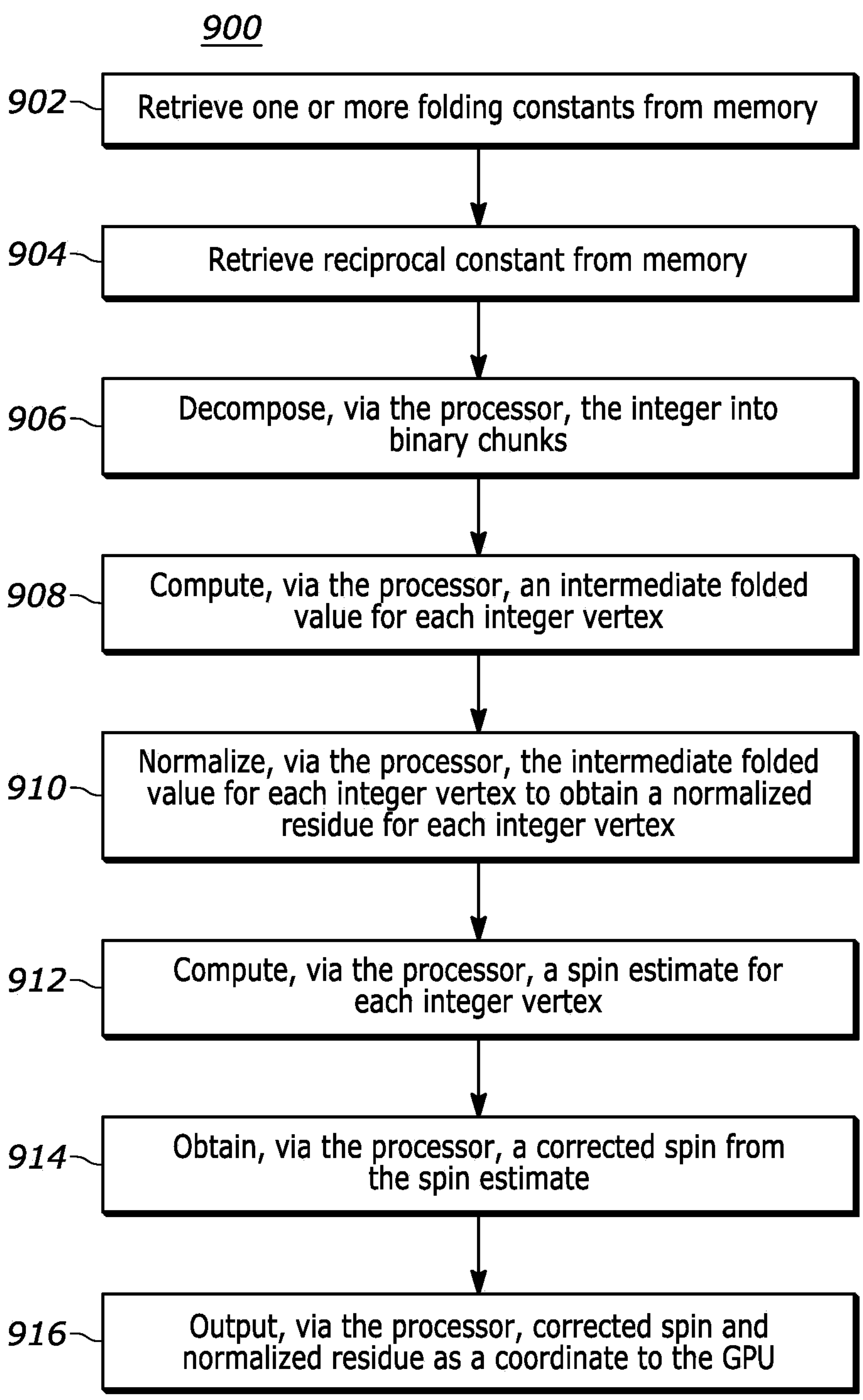
FIG. 9 illustrates a flowchart for a method for computing modular coordinates for integer vertices using divider-less folding, according to some aspects.

Referring to FIG. 9, a method 900 for computing modular coordinates for integer vertices using divider-less folding may be performed by a computing system (e.g., the computing system 602 of FIG. 6). The method 900 may transform integer values representing vertices of triangles in a three-dimensional graphical space into coordinate pairs comprising normalized residues and spins without performing division operations in a primary execution path.

The method 900 may include retrieving one or more folding constants from memory (e.g., main memory, cache memory, or a combination thereof, such as the memory 626 of FIG. 6) (step 902). This step may involve the processor (e.g., the processor 620 of FIG. 6) retrieving the precomputed folding constants from the memory. The one or more folding constants may include values representing a fixed binary base raised to successive powers modulo the modulus W, such as $k_0=2^0 \bmod W=1$, $k_1=2^{16} \bmod W$, $k_2=2^{32} \bmod W$, and $k_3=2^{48} \bmod W$ for 16-bit binary chunks.

The method 900 may include retrieving a reciprocal constant from memory (step 904). This step may involve the processor retrieving the precomputed reciprocal constant μ from the memory. The reciprocal constant μ may be computed as $\mu=[2^b/W]$, where b is the bit-width, and stored in the memory, enabling subsequent spin computations to avoid division operations in the primary execution path.

With continued reference to FIG. 9, the method 900 may include the processor decomposing the integer into binary chunks (step 906). This step may involve the processor decomposing each integer vertex into binary chunks using bit extraction operations implemented via hardwired routing, shift-and-mask logic, or equivalent mechanisms. For a 64-bit integer, step 906 may extract four 16-bit chunks designated as $a_0$, $a_1$, $a_2$, and $a_3$ from bit positions [15:0], [31:16], [47:32], and [63:48] respectively.

The method 900 may include the processor computing an intermediate folded value for each integer vertex (step 908). This step may involve the processor computing the product between each folding constant and its corresponding binary chunk and then compute the intermediate folded value as the sum of these products. For example, the intermediate folded value may be computed as $r_{raw}=a_0*k_0+a_1*k_1+a_2*k_2+a_3*k_3$.

The method 900 may include the processor normalizing the intermediate folded value for each integer vertex (step 910). This step may involve the processor determining whether the intermediate folded value reaches or exceeds the modulus W and perform bounded adjustment operations to reduce the residue to within the range [0, W). In some embodiments, the conditional subtraction normalization step may require a bounded number of subtractions (e.g., zero to two) to bring the intermediate folded value into the range [0, W) when W is chosen to be close to a power of two.

The method 900 may include the processor computing a spin estimate for each integer vertex (step 912). This step may involve the processor computing the product of the integer N and the reciprocal constant μ, producing a double-width product (e.g., a 128-bit product from two 64-bit operands). The processor may then extract the upper half of the double-width product (e.g., the upper 64 bits) by selecting the high-order bits to yield a spin estimate.

In some embodiments, computing the spin may further include evaluating a check value derived from the integer, the extracted high-order bits, and the modulus to determine whether the extracted spin underestimates or overestimates the floor of a quotient of the integer divided by the modulus. When the check value indicates underestimation, the processor may increment the spin by one. In some embodiments, the increment operation may be performed a bounded number of times to obtain a corrected spin value. When the check value indicates overestimation, the processor may decrement the spin by one. The bounded corrections may ensure the spin value is consistent with the invariant $N=s \cdot W+r$ without recomputing a quotient or remainder via division.

The method 900 may include obtaining a corrected spin from the spin estimate using the processor (step 914). This step may involve determining whether the spin estimate requires correction based on a comparison between the product of the spin estimate and the modulus and the integer. When the product of the spin estimate and the modulus is greater than the integer, the one or more digital circuits may decrement the spin estimate by one. When the product of the spin estimate incremented by one and the modulus is less than or equal to the integer, the one or more digital circuits may increment the spin estimate by one. In some embodiments, the correction may require no more than one corrective decrement if the spin estimate is too high, or one corrective increment if the spin estimate is too low. In other embodiments, the reciprocal constant is selected such that the spin estimate underestimates the true spin, enabling increment-only correction. In still other embodiments the reciprocal constant may permit overestimation, requiring bounded decrement and/or increment correction.

The method 900 may include outputting the corrected spin and normalized residue as a coordinate pair from the processor to the GPU (e.g., the GPU 622 of FIG. 6) (step 916). This step may involve the processor transmitting the normalized residue and the corrected spin to the GPU for subsequent graphics processing operations. The coordinate pair may represent the integer vertex relative to the modulus, where the spin indicates the number of complete modulus cycles contained within the integer and the normalized residue indicates the remainder after those cycles. The method 900 provides a technical improvement in computer operation by producing bounded residue and spin coordinate values using precomputed constants and correction operations, reducing reliance on division or modulus re-computation.

In some embodiments, the method 900 may be performed in different sequential orders than depicted in FIG. 9. For example, step 902 and step 904 may be performed in parallel or in reverse order. In some embodiments, one or more steps of the method 900 may be omitted, combined with other steps, or replaced with alternative operations that achieve equivalent results. In other embodiments, one or more of the residue computation steps (steps 906-910) and the spin estimation steps (steps 912-914) may be performed partially or fully in parallel, and FIG. 9 illustrates one exemplary ordering rather than a required execution sequence. The method 900 may be implemented using different hardware components, software modules, or combinations than those described with respect to FIG. 6.

Exemplary Streaming Update Logic

Figure 10:
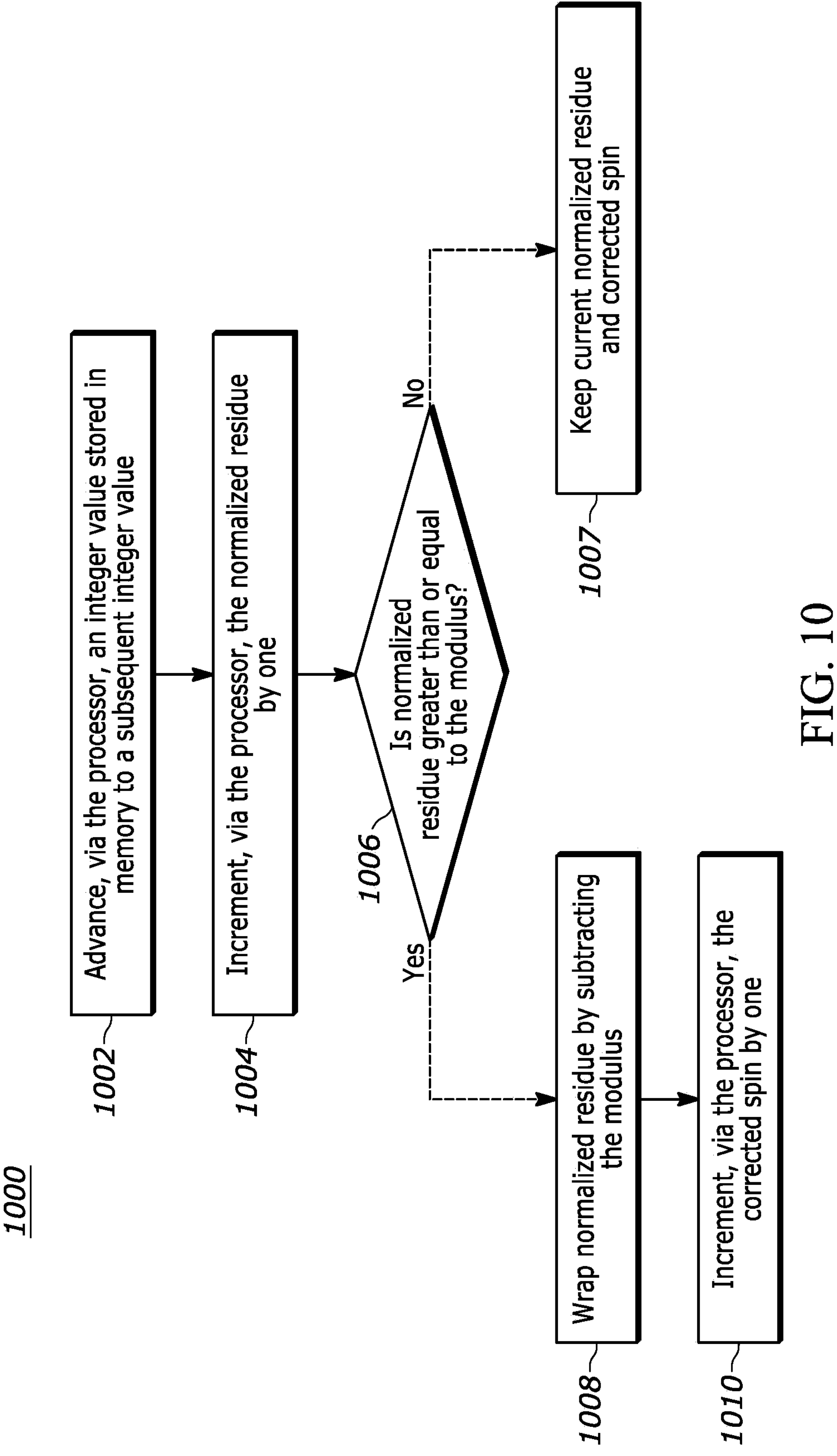
FIG. 10 illustrates a flowchart for a method for streaming updates of modular coordinates, according to some aspects.

Referring to FIG. 10, a method 1000 for streaming updates of modular coordinates may be performed by a computing system (e.g., the computing system 602 of FIG. 6). The method 1000 may maintain residue and spin coordinates incrementally when processing consecutive integers without recomputing the full folding pipeline. The method 1000 may enable efficient sequential processing of integer values without performing division operations in a primary execution path. FIG. 10 illustrates a processor-executed embodiment of the streaming update logic described with respect to FIG. 5.

In some embodiments, the residue and spin values are maintained as primary execution state and are updated incrementally for consecutive integers, as illustrated in FIG. 10. In other embodiments, residue and spin values are derived on a per-integer basis via folding and reciprocal-based computation, and streaming update logic is not employed. The streaming update mechanisms described herein are optional embodiments and are not required for implementations that compute modular coordinates independently for each integer value.

The method 1000 may begin with a processor (e.g., the Processor 620 of FIG. 6) advancing an integer value stored in memory to a subsequent integer value (step 1002). This step may involve advancing the integer value stored in one or more memories from a current value N to a subsequent value N+1.

The method 1000 may include the processor incrementing the normalized residue by one (step 1004). This step may involve incrementing the normalized residue value r from a current value to r+1.

With continued reference to FIG. 10, the method 1000 may include determining if the normalized residue is greater than or equal to the modulus (step 1006). This step may include the processor comparing the incremented normalized residue value against the modulus W and producing an indication of whether the normalized residue is greater than or equal to the modulus. This step may further involve checking the condition flag generated by the processor to determine which branch of the streaming update logic is executed.

If the normalized residue is less than the modulus (No branch from step 1006), the method 1000 may include keeping the current normalized residue and corrected spin (step 1007). This step may involve the normalized residue and corrected spin values remaining unchanged in maintained execution state (e.g., in registers, cache, or memory 626 of FIG. 6), and the streaming update for the current integer may be complete. The coordinate pair (r, s) may continue to represent the integer relative to the modulus without modification to the corrected spin value.

If the normalized residue is greater than or equal to the modulus (Yes branch from step 1006), the method 1000 may include wrapping the normalized residue (step 1008). Wrapping the normalized residue may involve subtracting the modulus from the incremented residue to wrap the residue into the range [0, W), which, for an increment-by-one operation, thereby returning the residue to the valid range [0, W). The method 1000 may include the processor incrementing the corrected spin by one (step 1010). This step may involve the corrected spin value s being incremented from a current value to s+1, indicating that an additional complete modulus cycle has been traversed.

The method 1000 may maintain the execution state invariant N=s*W+r for a sequence of integer values without performing division operations. The coordinate pairs are updated incrementally across successive inputs, maintaining exactness over extended sequences while reducing computational overhead relative to re-computation-based approaches. The streaming update mechanism may maintain correctness for a sufficiently large number of sequential updates relative to the maintained execution state, without requiring re-synchronization of the residue-spin coordinate representation. The bounded operations may provide deterministic execution timing that facilitates pipeline scheduling for high-throughput streaming workloads.

The streaming update mechanism of the method 1000 may provide performance improvements for workloads that process sequences of consecutive integers. By incrementing the residue and conditionally incrementing the spin using addition and comparison operations, the method 1000 may avoid recomputing the full folding pipeline for each integer in the sequence. The method 1000 may bypass the chunk extraction, folding constant multiplication, and summation stages when processing consecutive integers, reducing the computational cost per integer in streaming workloads such as sieving operations, sequential data processing, or counter-based workloads.

In some embodiments, the method 1000 may be performed in different sequential orders than depicted in FIG. 10. In other embodiments, one or more steps of the method 1000 may be omitted, combined with other steps, or replaced with alternative operations that achieve equivalent results. The method 1000 may be implemented using different hardware components, software modules, or combinations than those described with respect to FIG. 6.

Exemplary Aspects

Aspect 1. An integrated circuit, comprising: a cache; one or more registers; one or more digital circuits; and a control unit (CU) configured to control execution of operations for computing modular coordinates for an integer relative to a modulus, the operations comprising: fetching, from the cache, one or more folding constants, wherein the one or more folding constants are precomputed using the modulus; fetching, from the cache, a reciprocal constant, wherein the reciprocal constant is precomputed using the modulus; loading the integer, the modulus, the one or more folding constants and the reciprocal constant into a set of first registers; decomposing, using one or more hardwired operations, the integer into binary chunks; computing, using the one or more digital circuits, an intermediate folded value, wherein the intermediate folded value is a sum of products of each folding constant and its corresponding binary chunk; normalizing, using the one or more digital circuits, the intermediate folded value by using a bounded number of subtraction operations to obtain a normalized residue; computing, using the one or more digital circuits, a spin estimate, wherein the spin estimate comprises one or more high bits of a product of the integer and the reciprocal constant; obtaining, using the one or more digital circuits, a corrected spin from the spin estimate; and outputting, to a set of second registers, the normalized residue and the corrected spin as a coordinate pair.

Aspect 2. The integrated circuit of aspect 1, wherein the modulus is a product of one or more small prime integers and is approximate to a power of two.

Aspect 3. The integrated circuit of any of aspects 1-2, wherein the one or more folding constants are equal to one or more remainders of a base corresponding to a size of the binary chunks, taken to an integer power corresponding to a number of binary chunks, modulo the modulus.

Aspect 4. The integrated circuit of any of aspects 1-3, wherein the reciprocal constant is equal to a floor of a quotient of two to a power of a bit-width of the integer divided by the modulus.

Aspect 5. The integrated circuit of any of aspects 1-4, wherein computing, using the one or more digital circuits, the intermediate folded value, further comprises: computing in parallel, the using one or more digital circuits, a product of each folding constant and its corresponding binary chunk.

Aspect 6. The integrated circuit of any of aspects 1-5, wherein the operations for computing modular coordinates for the integer relative to the modulus further comprise a streaming update logic for consecutive integers operating on stored residue and spin state, the streaming update logic comprising: advancing, using the one or more digital circuits, a register storing the integer value to a subsequent integer value; incrementing, using the one or more digital circuits, the normalized residue by one; determining, using the one or more digital circuits, if the normalized residue is greater than or equal to the modulus; and when the normalized residue is greater than or equal to the modulus: wrapping, using the one or more digital circuits, the normalized residue by subtracting the modulus; and incrementing, using the one or more digital circuits, the corrected spin by one.

Aspect 7. The integrated circuit of any of aspects 1-6, wherein obtaining, using the one or more digital circuits, the corrected spin from the spin estimate, further comprises: determining, using the one or more digital circuits, whether a check value derived from the integer, the modulus, and the spin estimate indicates that the spin estimate underestimates a floor of a quotient of the integer divided by the modulus; when the spin estimate underestimates the floor of a quotient of the integer divided by the modulus, incrementing, using the one or more digital circuits, the spin estimate a bounded number of times to obtain the corrected spin; determining, using the one or more digital circuits, whether the check value derived from the integer, the modulus, and the spin estimate indicates that the spin estimate overestimates a floor of a quotient of the integer divided by the modulus; and when the spin estimate overestimates the floor of a quotient of the integer divided by the modulus, decrementing, using the one or more digital circuits, the spin estimate a bounded number of times to obtain the corrected spin.

Aspect 8. The integrated circuit of any of aspects 1-7, further comprising: an arithmetic logic unit (ALU), wherein the ALU includes the one or more digital circuits.

Aspect 9. A computing system for processing three-dimensional (3D) graphics comprising: a processor; a graphics processing unit (GPU); and one or more memories, having stored thereon computer-executable instructions for computing modular coordinates for a set of integers representing vertices of a triangle in a three-dimensional (3D) graphical space, relative to a modulus, that when executed, cause the computing system to: retrieve, from the one or more memories, one or more folding constants, wherein the one or more folding constants are precomputed using the modulus; retrieve, from the one or more memories, a reciprocal constant, wherein the reciprocal constant is precomputed using the modulus; decompose, via the processor, each integer vertex into binary chunks; compute, via the processor, an intermediate folded value for each integer vertex, wherein the intermediate folded value is a sum of products of each folding constant and its corresponding binary chunk; normalize, via the processor, the intermediate folded value for each integer vertex by using a bounded number of subtraction operations to obtain a normalized residue; compute, via the processor, a spin estimate for each integer vertex, wherein the spin estimate comprises one or more high bits of a product of the integer vertex and the reciprocal constant; obtain, via the processor, a corrected spin from the spin estimate; and output, via the processor, to the GPU, for each integer vertex the normalized residue and the corrected spin as coordinate pairs.

Aspect 10. The computing system of aspect 9, wherein the modulus is a product of one or more small prime integers and is approximate to a power of two.

Aspect 11. The computing system of any of aspects 9-10, wherein the one or more folding constants are equal to one or more remainders of a base corresponding to a size of the binary chunks, taken to an integer power corresponding to a number of binary chunks, modulo the modulus.

Aspect 12. The computing system of any of aspects 9-11, wherein the reciprocal constant is equal to a floor of a quotient of two to a power of a bit-width of the integer vertex divided by the modulus.

Aspect 13. The computing system of any of aspects 9-12, the computer-executable instructions for computing modular coordinates for the set of integers representing vertices of a triangle in 3D graphical space, relative to the modulus further comprising: advancing, via the processor, an integer value stored in memory to a subsequent integer value; incrementing, via the processor, the normalized residue by one; determining, via the processor, if the normalized residue is greater than or equal to the modulus; and when the normalized residue is greater than or equal to the modulus: wrapping, via the processor, the normalized residue by subtracting the modulus; and incrementing, via the processor, the corrected spin by one.

Aspect 14. The computing system of any of aspects 9-13, obtaining, via the processor, a corrected spin from the spin estimate, further comprises: determining, via the processor, whether a check value derived from the integer vertex, the modulus, and the spin estimate indicates that the spin estimate underestimates a floor of a quotient of the integer vertex divided by the modulus; when the spin estimate underestimates the floor of a quotient of the integer vertex divided by the modulus, incrementing, via the processor, the spin estimate a bounded number of times to obtain the corrected spin; determining, via the processor, whether a check value derived from the integer vertex, the modulus, and the spin estimate indicates that the spin estimate overestimates a floor of a quotient of the integer vertex divided by the modulus; and when the spin estimate overestimates the floor of a quotient of the integer vertex divided by the modulus, decrementing, via the processor, the spin estimate a bounded number of times to obtain the corrected spin.

Aspect 15. The computing system of aspect 14, wherein the GPU uses the coordinate pairs to perform a graphical processing operation, wherein the graphical processing operation includes (i) screen wrapping, (ii) texture tiling, (iii) pattern animation, (iv) pixel dithering, or (v) processing a polygonal mesh.

Aspect 16. The computing system of aspect 15, wherein the graphical processing operation is performed to project a three-dimensional object onto a two-dimensional display.

Aspect 17. The computing system of any of aspects 9-16, wherein $$k_i = 2^{B_i} \bmod W$$

where $k_i$ are the one or more folding constants, $B_i$ are the starting bit positions for the binary chunk i, and W is the modulus.

Aspect 18. The computing system of aspect 17, wherein $$r_{raw} = \sum_{i=0}^{n-1} \alpha_i k_i$$

where $r_{raw}$ is the intermediate folded value prior to normalization, n corresponds to a number of binary chunks derived from the bit-width of an integer and the chosen chunk size, and $a_i$ are the one or more binary chunks.

Aspect 19. The computing system of any of aspects 9-18, wherein $$\mu = \left\lfloor \frac{2^b}{W} \right\rfloor$$

where μ is the reciprocal constant, b is a selected bit-width, and W is the modulus.

Aspect 20. The computing system of any of aspects 9-19, wherein $$s_{est} = \text{HIGH}(N * \mu)$$

where $s_{est}$ is the spin estimate, N is an integer, u is the reciprocal constant, and HIGH is a high-bit extraction operator that returns the upper bits of a double-width product.

Additional Considerations

Although the preceding and following text sets forth a detailed description of numerous different embodiments, it should be understood that the legal scope of the invention may be defined by the words of the claims set forth at the end of this patent. The detailed description is to be construed as exemplary and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It may be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not just residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not just residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. An integrated circuit, comprising:

a cache;

one or more registers;

one or more digital circuits; and a control unit (CU) configured to control execution of operations for computing modular coordinates for an integer relative to a modulus, the operations comprising:

fetching, from the cache, one or more folding constants, wherein the one or more folding constants are precomputed using the modulus;

fetching, from the cache, a reciprocal constant, wherein the reciprocal constant is precomputed using the modulus;

loading the integer, the modulus, the one or more folding constants and the reciprocal constant into a set of first registers;

decomposing, using one or more hardwired operations, the integer into binary chunks;

computing, using the one or more digital circuits, an intermediate folded value, wherein the intermediate folded value is a sum of products of each folding constant and its corresponding binary chunk;

normalizing, using the one or more digital circuits, the intermediate folded value by using a bounded number of subtraction operations to obtain a normalized residue;

computing, using the one or more digital circuits, a spin estimate, wherein the spin estimate comprises one or more high bits of a product of the integer and the reciprocal constant;

obtaining, using the one or more digital circuits, a corrected spin from the spin estimate; and outputting, to a set of second registers, the normalized residue and the corrected spin as a coordinate pair.

2. The integrated circuit of claim 1, wherein the modulus is a product of one or more small prime integers and is approximate to a power of two.

3. The integrated circuit of claim 1, wherein the one or more folding constants are equal to one or more remainders of a base corresponding to a size of the binary chunks, taken to an integer power corresponding to a number of binary chunks, modulo the modulus.

4. The integrated circuit of claim 1, wherein the reciprocal constant is equal to a floor of a quotient of two to a power of a bit-width of the integer divided by the modulus.

5. The integrated circuit of claim 1, wherein computing, using the one or more digital circuits, the intermediate folded value, further comprises:

computing in parallel, using one or more digital circuits, a product of each folding constant and its corresponding binary chunk.

6. The integrated circuit of claim 1, wherein the operations for computing modular coordinates for the integer relative to the modulus further comprise a streaming update logic for consecutive integers operating on stored residue and spin state, the streaming update logic comprising:

advancing, using the one or more digital circuits, a register storing the integer to a subsequent integer value;

incrementing, using the one or more digital circuits, the normalized residue by one;

determining, using the one or more digital circuits, if the normalized residue is greater than or equal to the modulus; and when the normalized residue is greater than or equal to the modulus:

wrapping, using the one or more digital circuits, the normalized residue by subtracting the modulus; and incrementing, using the one or more digital circuits, the corrected spin by one.

7. The integrated circuit of claim 1, wherein obtaining, using the one or more digital circuits, the corrected spin from the spin estimate, further comprises:

determining, using the one or more digital circuits, whether a check value derived from the integer, the modulus, and the spin estimate indicates that the spin estimate underestimates a floor of a quotient of the integer divided by the modulus;

when the spin estimate underestimates the floor of a quotient of the integer divided by the modulus, incrementing, using the one or more digital circuits, the spin estimate a bounded number of times to obtain the corrected spin;

determining, using the one or more digital circuits, whether the check value derived from the integer, the modulus, and the spin estimate indicates that the spin estimate overestimates a floor of a quotient of the integer divided by the modulus; and when the spin estimate overestimates the floor of a quotient of the integer divided by the modulus, decrementing, using the one or more digital circuits, the spin estimate a bounded number of times to obtain the corrected spin.

8. The integrated circuit of claim 1, further comprising:

an arithmetic logic unit (ALU), wherein the ALU includes the one or more digital circuits.

9. A computing system for processing three-dimensional (3D) graphics comprising:

a processor;

a graphics processing unit (GPU); and one or more memories, having stored thereon computer-executable instructions for computing modular coordinates for a set of integers representing vertices of a triangle in a three-dimensional (3D) graphical space, relative to a modulus, that when executed, cause the computing system to:

retrieve, from the one or more memories, one or more folding constants, wherein the one or more folding constants are precomputed using the modulus;

retrieve, from the one or more memories, a reciprocal constant, wherein the reciprocal constant is precomputed using the modulus;

decompose, via the processor, each integer vertex into binary chunks;

compute, via the processor, an intermediate folded value for each integer vertex, wherein the intermediate folded value is a sum of products of each folding constant and its corresponding binary chunk;

normalize, via the processor, the intermediate folded value for each integer vertex by using a bounded number of subtraction operations to obtain a normalized residue;

compute, via the processor, a spin estimate for each integer vertex, wherein the spin estimate comprises one or more high bits of a product of an integer vertex and the reciprocal constant;

obtain, via the processor, a corrected spin from the spin estimate; and output, via the processor, to the GPU, for each integer vertex the normalized residue and the corrected spin as coordinate pairs.

10. The computing system of claim 9, wherein the modulus is a product of one or more small prime integers and is approximate to a power of two.

11. The computing system of claim 9, wherein the one or more folding constants are equal to one or more remainders of a base corresponding to a size of the binary chunks, taken to an integer power corresponding to a number of binary chunks, modulo the modulus.

12. The computing system of claim 9, wherein the reciprocal constant is equal to a floor of a quotient of two to a power of a bit-width of the integer vertex divided by the modulus.

13. The computing system of claim 9, the computer-executable instructions for computing modular coordinates for the set of integers representing vertices of a triangle in 3D graphical space, relative to the modulus further comprising:

advancing, via the processor, an integer value stored in memory to a subsequent integer value;

incrementing, via the processor, the normalized residue by one;

determining, via the processor, if the normalized residue is greater than or equal to the modulus; and when the normalized residue is greater than or equal to the modulus:

wrapping, via the processor, the normalized residue by subtracting the modulus; and incrementing, via the processor, the corrected spin by one.

14. The computing system of claim 9, obtaining, via the processor, a corrected spin from the spin estimate, further comprises:

determining, via the processor, whether a check value derived from the integer vertex, the modulus, and the spin estimate indicates that the spin estimate underestimates a floor of a quotient of the integer vertex divided by the modulus;

when the spin estimate underestimates the floor of a quotient of the integer vertex divided by the modulus, incrementing, via the processor, the spin estimate a bounded number of times to obtain the corrected spin;

determining, via the processor, whether a check value derived from the integer vertex, the modulus, and the spin estimate indicates that the spin estimate overestimates a floor of a quotient of the integer vertex divided by the modulus; and when the spin estimate overestimates the floor of a quotient of the integer vertex divided by the modulus, decrementing, via the processor, the spin estimate a bounded number of times to obtain the corrected spin.

15. The computing system of claim 14, wherein the GPU uses the coordinate pairs to perform a graphical processing operation, wherein the graphical processing operation includes (i) screen wrapping, (ii) texture tiling, (iii) pattern animation, (iv) pixel dithering, or (v) processing a polygonal mesh.

16. The computing system of claim 15, wherein the graphical processing operation is performed to project a three-dimensional object onto a two-dimensional display.

17. The computing system of claim 9, wherein $$k_i = 2^{B_i} \bmod W$$

where $k_i$ are the one or more folding constants, $B_i$ are starting bit positions for the ith binary chunk, and W is the modulus.

18. The computing system of claim 17, wherein $$r_{raw} = \sum_{i=0}^{n-1} a_i k_i$$

where $r_{raw}$ is the intermediate folded value prior to normalization, n corresponds to a number of binary chunks derived from a bit-width of an integer and a chosen chunk size and $a_i$ are one or more binary chunks.

19. The computing system of claim 9, wherein $$\mu = \left\lfloor \frac{2^b}{W} \right\rfloor$$

where μ is the reciprocal constant, b is a selected bit-width, and W is the modulus.

20. The computing system of claim 9, wherein $$s_{est} = \mathrm{HIGH}(N * \mu)$$

where $s_{est}$ is the spin estimate, N is an integer, μ is the reciprocal constant, and HIGH is a high-bit extraction operator that returns upper bits of a double-width product.

* * * * *